(12) United States Patent
Passmore et al.

(10) Patent No.: US 9,990,008 B2
(45) Date of Patent: Jun. 5, 2018

(54) MODULAR MULTI-MODE VIRTUAL REALITY HEADSET

(71) Applicant: Ariadne's Thread (USA), Inc., Solana Beach, CA (US)

(72) Inventors: Charles Gregory Passmore, Austin, TX (US); Adam Li, Solana Beach, CA (US)

(73) Assignee: Ariadne's Thread (USA), Inc., Solana Beach, CA (US)

( * ) Notice: Subject to any disclaimer, the term of this patent is extended or adjusted under 35 U.S.C. 154(b) by 307 days.

(21) Appl. No.: 14/821,298

(22) Filed: Aug. 7, 2015

(65) Prior Publication Data

US 2017/0039766 A1    Feb. 9, 2017

Related U.S. Application Data

(63) Continuation-in-part of application No. 14/820,870, filed on Aug. 7, 2015, now Pat. No. 9,606,362, which is a continuation-in-part of application No. 14/820,774, filed on Aug. 7, 2015, now Pat. No. 9,454,010.

(51) Int. Cl.
| | |
|---|---|
| *G06T 19/00* | (2011.01) |
| *G06F 1/16* | (2006.01) |
| *G02B 27/01* | (2006.01) |
| *G06F 3/01* | (2006.01) |

(52) U.S. Cl.
CPC ....... *G06F 1/1688* (2013.01); *G02B 27/0172* (2013.01); *G02B 27/0176* (2013.01); *G06F 1/163* (2013.01); *G06F 1/1684* (2013.01); *G06F 3/012* (2013.01); *G02B 2027/014* (2013.01); *G02B 2027/0123* (2013.01); *G02B 2027/0134* (2013.01); *G02B 2027/0138* (2013.01)

(58) Field of Classification Search
None
See application file for complete search history.

(56) References Cited

U.S. PATENT DOCUMENTS

| | | |
|---|---|---|
| 5,841,439 A | 11/1998 | Pose et al. |
| 6,445,815 B1 | 9/2002 | Sato |
| 2001/0010598 A1 | 8/2001 | Aritake et al. |
| 2007/0183649 A1 | 8/2007 | Kiefer et al. |

(Continued)

OTHER PUBLICATIONS

Benton, Alex, "Understanding the Oculus Rift Distortion Shader", Oculus Rift in Action, Aug. 9, 2013, Obtained from http://rifty-business.blogspot.com/2013/08/understanding-oculus-rift-distortion.html.

(Continued)

*Primary Examiner* — Andrew G Yang
(74) *Attorney, Agent, or Firm* — Arc IP Law, PC; Joseph J. Mayo

(57) ABSTRACT

A modular virtual reality headset that may be operated in multiple modes. Embodiments enable a mount with modular receivers having electronic and mechanical interfaces that accept swappable modules. Swappable modules may include swappable display modules, swappable audio modules, and swappable sensor modules. Embodiments enable multiple modes of operation, including for example a virtual mode to display virtual reality environments, a real mode to display images of the real environment surrounding the user, and an augmented reality mode that overlays real scenes with other information. Embodiments may also provide multiple modes of operation for audio.

19 Claims, 27 Drawing Sheets
(8 of 27 Drawing Sheet(s) Filed in Color)

(56) References Cited

U.S. PATENT DOCUMENTS

| | | | |
|---|---|---|---|
| 2008/0106489 A1* | 5/2008 | Brown | G02B 27/0172 |
| | | | 345/9 |
| 2010/0053164 A1 | 3/2010 | Imai et al. | |
| 2011/0018903 A1 | 1/2011 | Lapstun et al. | |
| 2012/0320088 A1 | 12/2012 | Ihara et al. | |
| 2013/0235696 A1 | 9/2013 | Larsen et al. | |
| 2013/0335543 A1* | 12/2013 | Hilkes | H04N 7/185 |
| | | | 348/62 |
| 2014/0049983 A1 | 2/2014 | Nichol et al. | |
| 2014/0146394 A1 | 5/2014 | Tout et al. | |
| 2014/0266990 A1 | 9/2014 | Makino et al. | |
| 2014/0327667 A1 | 11/2014 | Kim et al. | |
| 2015/0077416 A1* | 3/2015 | Villmer | G02B 27/017 |
| | | | 345/419 |
| 2015/0097858 A1 | 4/2015 | Miki et al. | |
| 2015/0100179 A1 | 4/2015 | Alaniz et al. | |
| 2015/0153575 A1 | 6/2015 | Komatsu et al. | |
| 2015/0219899 A1 | 8/2015 | Mack et al. | |
| 2015/0287230 A1 | 10/2015 | Cerny | |
| 2015/0294505 A1 | 10/2015 | Atsmon | |
| 2015/0362733 A1* | 12/2015 | Spivack | A63F 13/26 |
| | | | 345/633 |
| 2016/0116748 A1 | 4/2016 | Carollo et al. | |
| 2017/0031435 A1* | 2/2017 | Raffle | G06F 3/013 |

OTHER PUBLICATIONS

Benton, Alex, "Using Timewarp on the Oculus Rift", Oculus Rift in Action, Aug. 18, 2014, Obtained from http://rifty-business.blogspot.com/2014/08/using-timewarp-on-oculus-rift.html.

International Search Report received in PCT/US2017/024846, dated Jun. 14, 2017, 7 pages.

* cited by examiner

FIG. 2
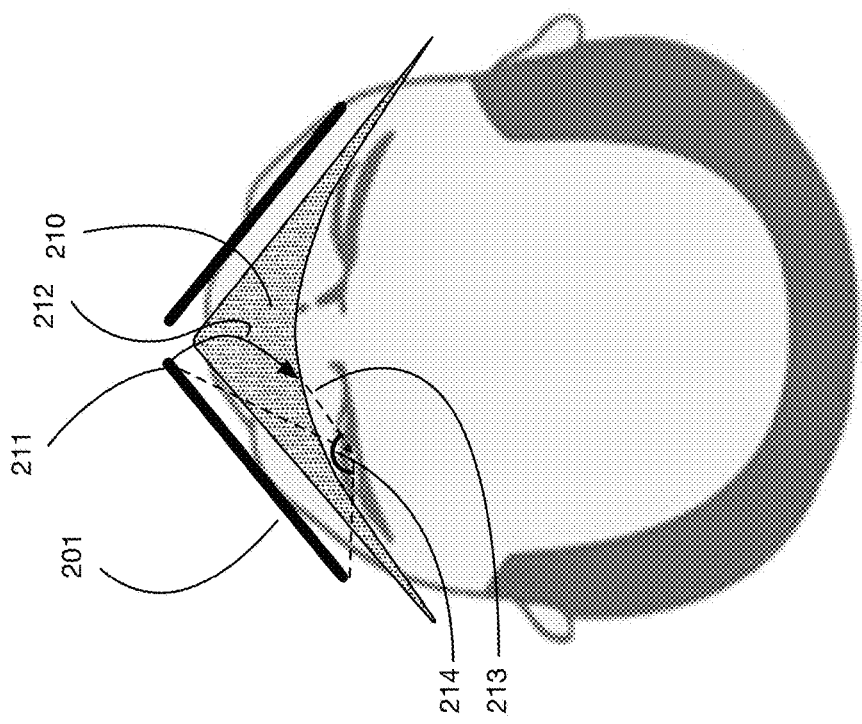
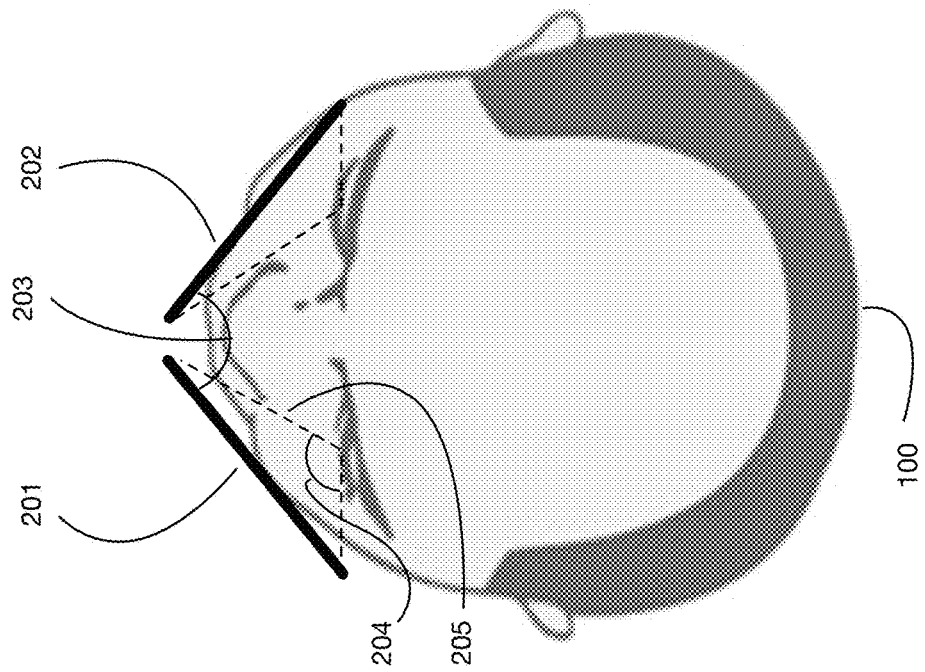

MODULAR MULTI-MODE VIRTUAL REALITY HEADSET

This application is a continuation in part of U.S. Utility patent application Ser. No. 14/820,870, filed Aug. 7, 2015, which is a continuation in part of U.S. Utility patent application Ser. No. 14/820,774, filed Aug. 7, 2015, the specifications of which are hereby incorporated herein by reference.

BACKGROUND OF THE INVENTION

Field of the Invention

One or more embodiments of the invention are related to the field of virtual reality systems. More particularly, but not by way of limitation, one or more embodiments of the invention enable a modular head mounted display system that can be operated in multiple modes to show virtual environments, real environments, or augmented reality environments.

Description of the Related Art

Virtual reality systems are known in the art. Such systems generate a virtual world for a user that responds to the user's movements. Examples include various types of virtual reality headsets and goggles worn by a user, as well as specialized rooms with multiple displays. Virtual reality systems typically include sensors that track a user's head, eyes, or other body parts, and that modify the virtual world according to the user's movements. The virtual world consists of a three-dimensional model, computer-generated or captured from real-world scenes. Images of the three-dimensional model may be affected by the user's position and orientation, or by other factors such as the user's actions or parameters of the user's physical state. Generation of these images requires rendering of the three-dimensional model onto one or more two-dimensional displays that are integrated into a head mounted device.

Existing virtual reality systems have fixed configurations and provide fixed, specific functionality for a user. These are typically used only for games or other fully virtual experiences. The hardware for existing virtual reality systems is not modular or extensible.

In particular, existing virtual reality systems typically do not support multiple operating modes. There are no known systems that provide standard interfaces for displays, audio, or sensors, so that these components can be swapped out for other components with different or additional features.

For at least the limitations described above there is a need for a modular multi-mode virtual reality headset.

BRIEF SUMMARY OF THE INVENTION

One or more embodiments described in the specification are related to a modular multi-mode virtual reality headset.

One or more embodiments of the system use a pair of angled displays and a lens system to create an immersive image covering a significant portion of a user's natural field of view. One or more embodiments use displays that are substantially flat; this configuration results in a wide field-of-view image using a compact display device that uses economical and readily available flat displays.

One or more embodiments of the system are incorporated into, attached to, or embedded in a mount that is configured to be worn on the head of a user or placed near the head of a user. This mount may include for example, without limitation, glasses, smart glasses, sunglasses, goggles, virtual reality goggles, a helmet, a visor, a hat, binoculars, a monocular, a telescope, or a microscope.

One or more embodiments include a left display and a right display, each located in front of the respective eye of the user. In one or more embodiments, the left display and right display may be substantially flat. Use of flat or substantially flat displays may provide cost and sourcing advantages since flat displays are readily available and can be manufactured at low cost. In one or more embodiments the left display and right display may be curved or formed from multiple sections angled with respect to one another; while curved displays may be more expensive in some cases, they may also simplify the geometry and optics of the system. Embodiments may use displays of any size or shape, along with one or more lenses to potentially increase the field of view.

In one or more embodiments, the left display and right display may be angled with respect to one another, rather than being parallel. For example, the angle between a plane tangent to the left display and a plane tangent to the right display may be less than 180 degrees, when measured from the side near the eyes of the user. This configuration may bring the left edge of the left display closer to the user's left eye, increasing the horizontal field of view perceived by the user. Similarly, this configuration may bring the right edge of the right display closer to the user's right eye, increasing the horizontal field of view perceived by the user.

One or more embodiments may include one or more lenses between the displays and the user's eyes. These lenses may for example form images of the displays that extends across a wider field of view than the displays themselves without the lenses. The lens or lenses may therefore increase the apparent field of view of the system. In one or more embodiments some or all of the pixels of the left and right displays may be substantially in focus when viewed through the lens or lenses. In one or more embodiment some or all of the pixels of the left and right displays may be out of focus to create diffuse images in certain portions of the field of view, for example at the periphery.

Embodiments of the system may use any type, number, and configuration of lenses. In one or more embodiments, one or more of the lenses may be a gradient index lens. A gradient index lens for example may provide significant curvature of the light rays from the displays with a relatively thin lens. In one or more embodiments, one or more of the lenses may be a Fresnel lens, which may also provide significant curvature of light rays with a relatively thin lens. One or more embodiments may use one or more holographic optical elements in conjunction with or in place of one or more lenses.

The image formed by the lens or lenses may be of any size and shape, and may extend across any vertical or horizontal field of view. In one or more embodiments the horizontal field of view of the image may for example exceed 120 degrees, 150 degrees, 180 degrees, or any other desired extent.

One or more embodiments of the system may use lower resolution at the periphery than in the central region of the user's field of view, to correspond to the variable resolution of the user's vision across the field of view. For example, one or more embodiments may include light emitting elements to the left of the left display, or to the right of the right display. These peripheral light emitting elements may for example be of lower resolution than the resolution of the left and right displays. In one or more embodiments the peripheral light emitting elements may have for example only vertical resolution and little or no horizontal resolution. In one or more embodiments the light from the peripheral light emitting elements may be directed by the lens or lenses towards the peripheries to form for example diffuse, low-resolution light in the peripheral portions of the user's field of view. In one or more embodiments the peripheral light emitters may be portions of the left and right displays, with pixels from these peripheral portions directed by the lens or lenses away from the focal points for the central regions of the left and right displays.

One or more embodiments of the system may use peripheral light emitters on the right and left sides of one or more central displays, either with or without lenses. The central displays may form one or more display images in a central portion of the user's field-of-view, and the light from the peripheral light emitters may be projected to the sides of the display images to fill all or a portion of the user's peripheral field-of-view.

In one or more embodiments the combined field of view from the central display images and the light from peripheral light emitters may span the user's entire natural field of view, which may exceed for example 180 degrees. One or more embodiments may generate images and peripheral light that spans a portion of the user's field of view, such as for example, without limitation, 120 degrees, 150 degrees, or 180 degrees.

Embodiments may use any number and configuration of peripheral light emitters. For example, in one or more embodiments, the peripheral light emitters may comprise a single left column of peripheral light pixels to the left of the central displays, and a single right column of peripheral light pixels to the right of the central displays. This arrangement provides only vertical resolution in the peripheral regions of the user's field of view. Other embodiments may provide both vertical and horizontal resolution in the peripheral regions. Embodiments may use any desired resolution for both central displays and peripheral light emitters, including for example resolutions of the peripheral light emitters that are lower than the resolution of the central displays, to match the user's lower vision resolution in these regions. In one or more embodiments, peripheral light emitters may be configured with any desired peripheral light pixel pattern with any desired vertical and horizontal resolution.

In one or more embodiments the light from peripheral light emitters may be directed towards the peripheral areas of the user's field of view, either directly or using one or more lenses. In one or more embodiments, reflective surfaces may be used on the peripheral regions of the viewable area of the mount to direct light towards the user. These left and right reflective surfaces may for example provide specular or diffuse reflection to generate peripheral light of any desired pattern and intensity. Reflective surfaces may be of any material, shape, size, color, and reflectivity. They may reflect all or any portion of the light falling on the surfaces towards the eyes of the user.

One or more embodiments of the system may include one or more renderers that generate the images viewed by the user from a 3D model of a scene. A 3D model may be for example a virtual reality environment, or videos captured of a real scene from several angles, or a combination of computer-generated and real elements. One or more embodiments may use a display renderer to generate the pixels for one or more central displays, and a peripheral renderer to determine the light colors and intensities for the peripheral light pixels of one or more peripheral light emitters. Because some embodiments may use peripheral light emitters of relatively low resolution compared to the central displays, one or more embodiments may employ various peripheral rendering approximations to calculate the light values for the peripheral light pixels. While these approximations may be inappropriate in some cases for the central display, where the user's field of view has high resolution, they may be sufficient for the peripheral field of view. Moreover, use of peripheral rendering approximations may reduce the computational and memory requirements for the system, potentially lowering cost and improving display latency.

One or more embodiments may calculate a peripheral rendering approximation that uses sample points within a peripheral light pixel area, and casts a ray from the user's eye (the left eye for the left peripheral light pixels, and the right eye for the right peripheral light pixels) through each sample point towards the 3D model. Using raycasting techniques known in the art, the color of the sample point may be determined by selecting the color of the first object in the 3D model hit by each ray. One or more embodiments may use for example an average of the sample point colors from raycasting to set the color for the associated peripheral light pixel.

One or more embodiments may calculate a peripheral rendering approximation that uses the pixel colors for central display pixels adjacent to or near to each peripheral light pixel. For example, one or more embodiments may use an average color for the adjacent or nearest display pixels as the color for each peripheral light pixel. This approximation may be highly efficient since the rendering performed by the display renderer is used directly for the peripheral rendering.

One or more lenses may be used in conjunction with any of the embodiments described above. Any type, number, and configuration of lenses may be used. Lenses may be for example, without limitation, gradient index lenses, Fresnel lenses, holographic optical elements, or traditional convex or concave lenses of uniform material.

One or more embodiments may provide a modular system that allows components to be swapped by a user. For example, one or more embodiments may have a mount attached to the user's head that includes receivers into which swappable modules may be inserted. Inserting these modules may establish electronic connections between the mount and the modules. Swappable modules may for example include swappable display modules, swappable audio modules, and swappable sensor modules. One or more embodiments may include one or more processors to manage communication of information between the mount and the swappable modular components. These processors may for example include a display processor, and audio mixing processor, and a sensor processor. In one or more embodiments these processors may be combined into a single processor.

One or more embodiments may have one or more display module receivers that accept one or more swappable display modules. Swappable display modules may for example include one or more displays, one or more cameras, and one or more display user input controls (such as buttons or switches for example). Any of these components may be present in any numbers, and any of them may be optional. Display module receivers may incorporate an electronic interface with communication channels to the swappable display modules. These communication channels may for example include a pixel channel that transfers pixel data from the display processor to the displays, a camera video channel that transfers camera video captured the cameras to the display processor, a camera control channel that transfers camera control commands from the display processor to the cameras, and a display user input channel that transfers user input commands from the display user input controls to the display processor.

One or more embodiments may have one or more audio module receivers that accept one or more swappable audio modules. Swappable audio modules may for example include one or more speakers, one or more microphones, and one or more audio user input controls. Any of these components may be present in any numbers, and any of them may be optional. Audio module receivers may incorporate an electronic interface with communication channels to the swappable audio modules. These communication channels may for example include an audio output channel that transfers audio data from the audio mixing processor to the speakers, an audio input channel that transfers audio data captured the microphones to the audio mixing processor, a microphone control channel that transfers microphone control commands from the audio mixing processor to the microphones, and an a audio user input channel that transfers user input commands from the audio user input controls to the audio mixing processor.

One or more embodiments may have one or more sensor module receivers that accept one or more swappable sensor modules. Swappable sensor modules may for example include one or more sensors that measure the position or orientation of a user, or that measure changes to the user's position or orientation. Any type or types of sensors may be used, including for example inertial sensors, magnets, distance sensors, or absolute or relative position sensors. Any of these components may be present in any numbers, and any of them may be optional. Sensor module receivers may incorporate an electronic interface with communication channels to the sensors. These communication channels may for example include a sensor data channel that transfers sensor data from sensors to the sensor processor. The sensor processor may calculate or estimate the user's orientation or position from the sensor data, and it may for example forward this information to the display processor or the audio mixing processor for use in generating virtual reality experiences that are based on the user's position or orientation.

One or more embodiments may support multiple operating modes that affect the operation of the display or audio modules. For example, embodiments may support a virtual mode, a real mode, and an augmented reality mode. In virtual mode, one or more embodiments may generate display images or audio based for example on a 3D virtual model or a previously captured 3D scene. This mode may for example correspond to a traditional virtual reality experience. In real mode, one or more embodiments may generate display images and audio that are captured from the real scene viewed by and heard by the user. In this mode for example, the images captured by cameras may be provided directly to displays, and the sounds captured by microphones may be provided directly to speakers. In augmented reality mode, one or more embodiments may alter the images and sounds of the real scene. These alterations may for example provide overlays of text or graphics onto images. These overlays may provide additional information about the objects viewed in a scene. Augmented reality mode may also be applied to audio, where actual audio captured by microphones is altered by the system for example with background noises, translations, commentaries, or other added information.

These three modes—virtual mode, real mode, and augmented reality mode—are illustrative. Any operation of a virtual reality headset that alters the communication channels between the processors and the modular system elements based on the operating mode is in keeping with the spirit of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIG. 2 illustrates the geometry of an embodiment of the system that has flat left and right displays at an angle, and a lens between the displays and the users' eyes that enlarges the field of view.

DETAILED DESCRIPTION OF THE INVENTION

A modular multi-mode virtual reality headset will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
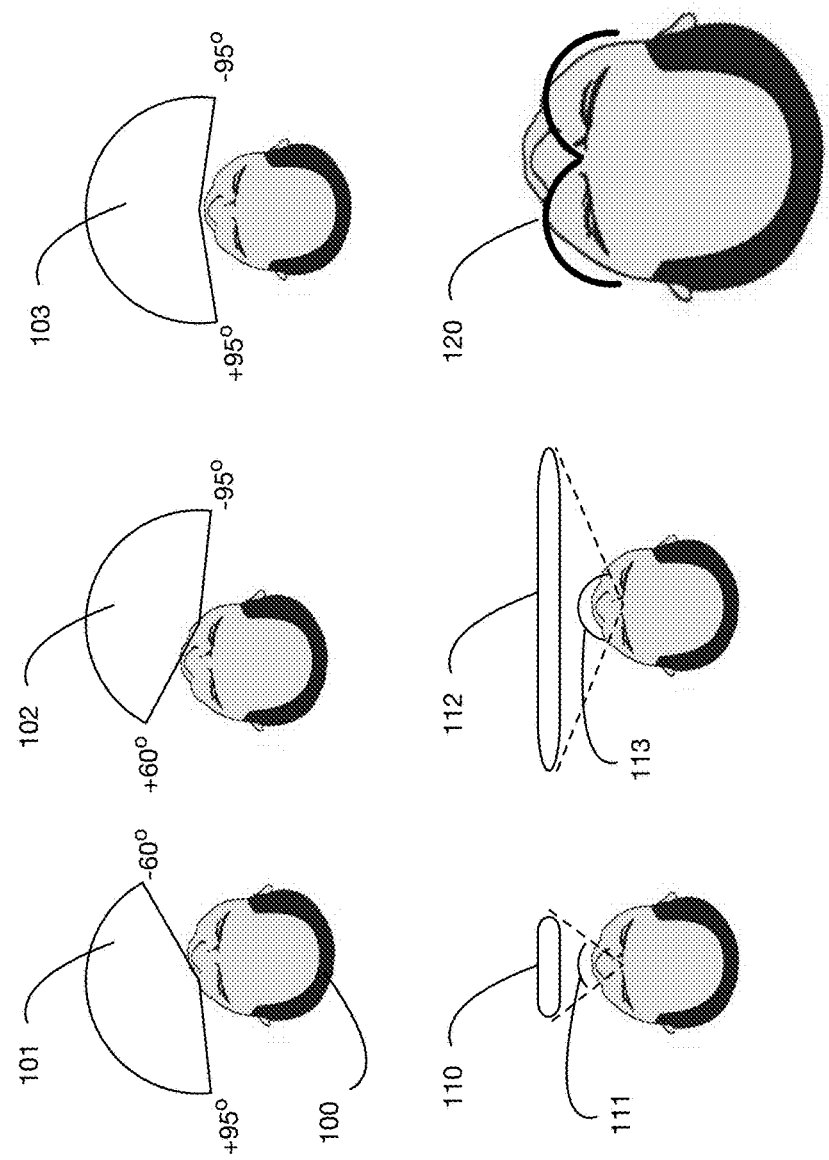
FIG. 1 illustrates the typical field of view of a user, and the challenge of creating a wide field-of-view display for a head mounted system.

FIG. 1 illustrates the challenge of providing a wide field-of-view display for a head mounted device. A typical user has a horizontal field of view 101 for the left eye and 102 for the right eye that each span approximately 155°. The combined field of view 103 for both eyes spans approximately 190°. In contrast, a typical head-mounted display like 110 has a small horizontal field of view 111. Thus a user with a typical head-mounted display like 110 does not have an immersive experience since much of the user's natural field of view is unused. FIG. 1 illustrates two potential approaches to enlarging the field of view of the display. One option is to use a much larger display 112, which increase the horizontal field of view to 113. This approach is undesirable because it results in displays that are bulky, heavy, and expensive. Another theoretical approach is to curve the display around each eye, as shown in 120. A disadvantage of this approach is that curved displays surrounding the entire field of view around an eye are not readily available and they may be expensive to manufacture.

FIG. 2 illustrates an approach used in one or more embodiments of the invention to increase the field of view of the display beyond that of a typical device 110 in FIG. 1. The display is separated into a left display 201 in front of the left eye of the user, and right display 202 in front of the right eye of the user. In the embodiment shown in FIG. 1 the left and right displays are flat or substantially flat, which may in some cases provide cost or sourcing advantages. In one or more embodiments the left or right display (or both) may be further segmented into multiple displays. In FIG. 2, the left edge of display 201 is angled towards the user 100, which brings this left edge further towards the leftward extreme of the user's field of view. Similarly the right edge of display 202 is angled towards the user, which brings the right edge further towards the rightward extreme of the user's field of view. The left display 201 and right display 202 are therefore not parallel; they are at an angle 203 that is less than 180°. The left eye field of view 204 that results from angling the display may be larger in some embodiments that the corresponding field of view for a narrow angle flat display like display 101 in FIG. 1. Embodiments may use left and right displays of any size and shape. In one or more embodiments the left and right displays may be curved for example, or formed from multiple sections lying on different planes, instead of flat as shown in the embodiment of FIG. 1. One or more embodiments may use flat displays for ease of manufacturing and sourcing. The angles 203 and 204 are only illustrative; one or more embodiments may use any angle between left and right displays, and may use any desired width and height for the left and right displays. For embodiments that use curved displays, the angle between displays may be considered for example to be the angle between planes that are tangent to each display at selected points on the displays.

One or more embodiments may further extend or alter the field of view for the display by using one or more lenses between the displays and the eyes of the user. This is illustrated in the right side of FIG. 2, with lens 210 between the displays and the user's eyes. One or more embodiments may use any number and configuration of lenses to bend, focus, or otherwise direct the light emitted or reflected from the displays. Lenses may be of any desired material and shape. One or more embodiments may use one or more adjustable lenses that may for example be focused or otherwise adjusted by a user. In FIG. 2, Lens 210 bends the light rays emitted from the displays 201 and 201 so that they appear to be coming from different directions. Thus the image of the display pixels viewed by the user may have a larger field of view than the displays themselves (without the lens or lenses). For example, light ray 212 from pixel 211 on left display 201 is bent by lens 210, so that the apparent direction 213 of this pixel is further to the right than the direction 205 of the pixel when viewed without the lens. Thus the horizontal field of view 214 of the image of the left display with the lens is greater than the field of view 204 without the lens. Similarly the field of view of the image of the right display with the lens is greater than the field of view without the lens. One or more embodiments may therefore use one or more lenses to enlarge the apparent field of view of the displays.

Figure 3:
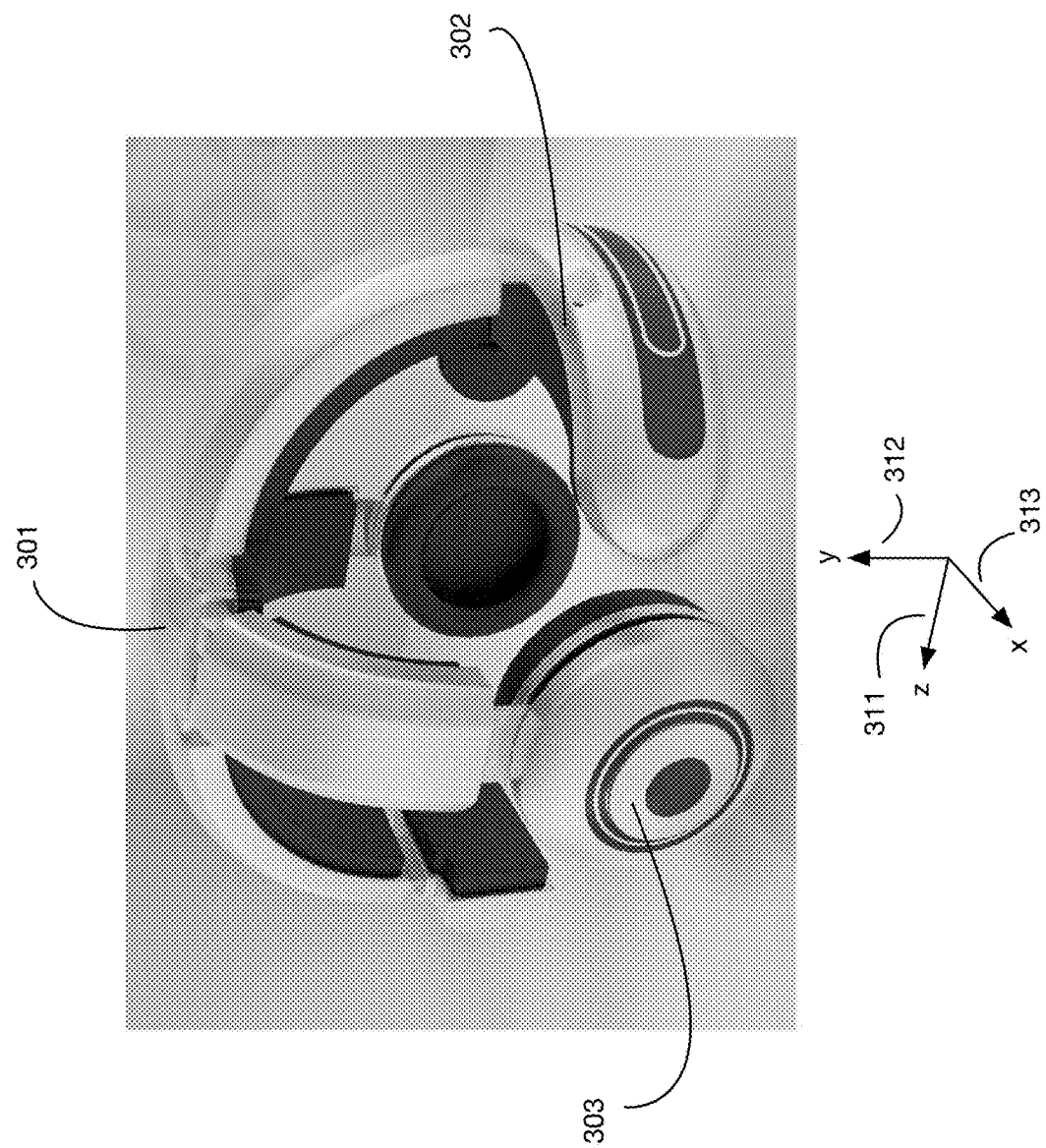
FIG. 3 illustrates an embodiment of head mounted system that incorporates a wide field-of-view display.

FIG. 3 illustrates an embodiment that incorporates a wide field of view display into mount 301. Axis 311 (z) of the figure as shown points backwards (into the user's eyes); axis 313 (x) points left-to-right, and axis 312 (y) points bottom-to-top. The front area 302 of the mount houses for example the left and right displays and the lens or lenses (for example as shown in FIG. 2). Speaker 303 may be used in one or more embodiments to provide audio in addition to video. The shape and components illustrated in FIG. 3 are illustrative only; embodiments may incorporate a wide field of view display system into any head mounted device of any size, shape, and configuration.

Figure 4:
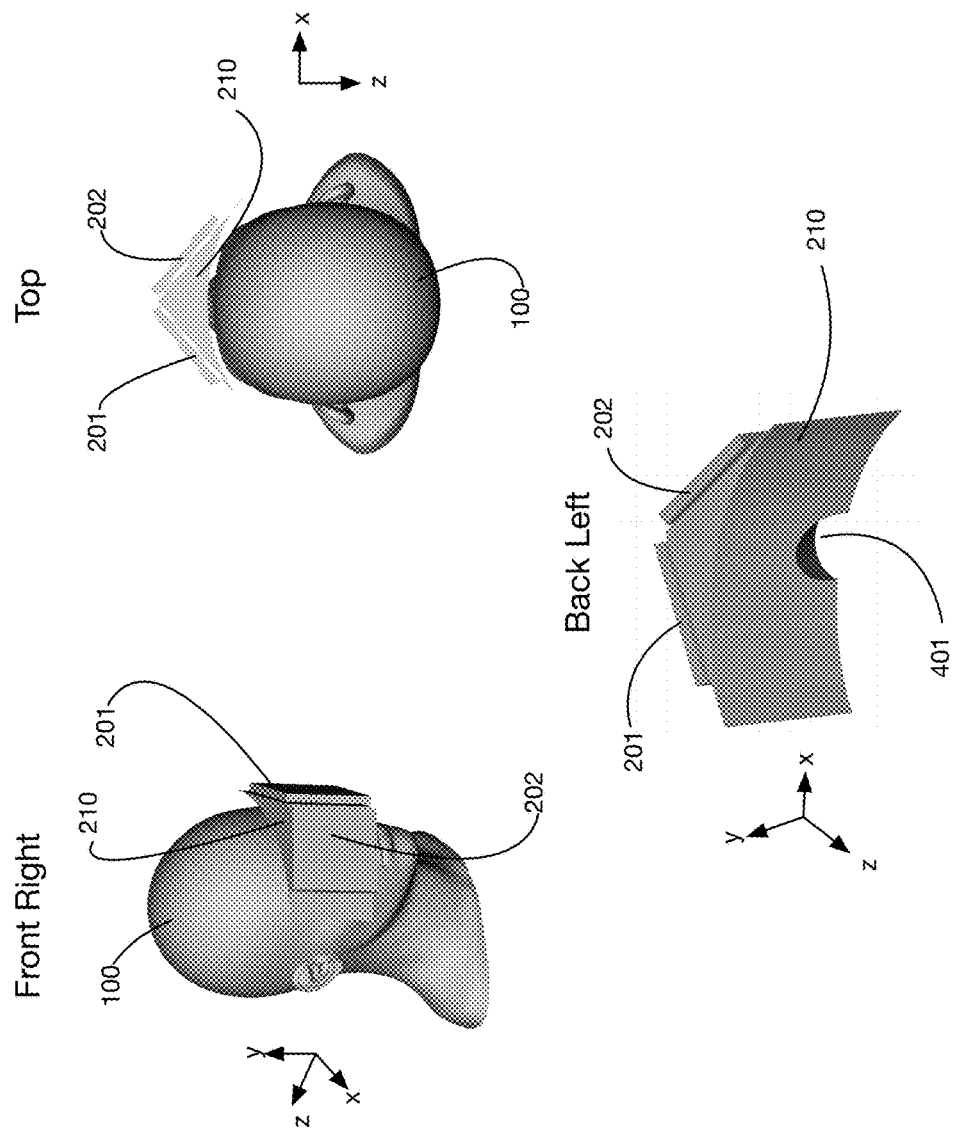
FIG. 4 shows a three dimensional model of the displays and lens for an embodiment of the system.

FIG. 4 illustrates several 3D views of an embodiment of the system from different orientations. Only the displays and lens are shown; other elements of a mount (such as for example the mount of FIG. 3) are not shown. The coordinate axes from FIG. 3 are shown for reference for each view. In the back left view, cutout 401 in the lens 210 is apparent; this cutout is for the user's nose. One or more embodiments may use lenses or displays of any shape or size. For example, lenses or displays may be configured to conform to any shape of a user, or of any device worn by or used by a user. As an example, one or more embodiments may be configured to be attached to any device worn by a user, such as for example, without limitation, glasses, sunglasses, goggles, helmets, visors, hats, contact lenses, or ocular implants.

Figure 5:
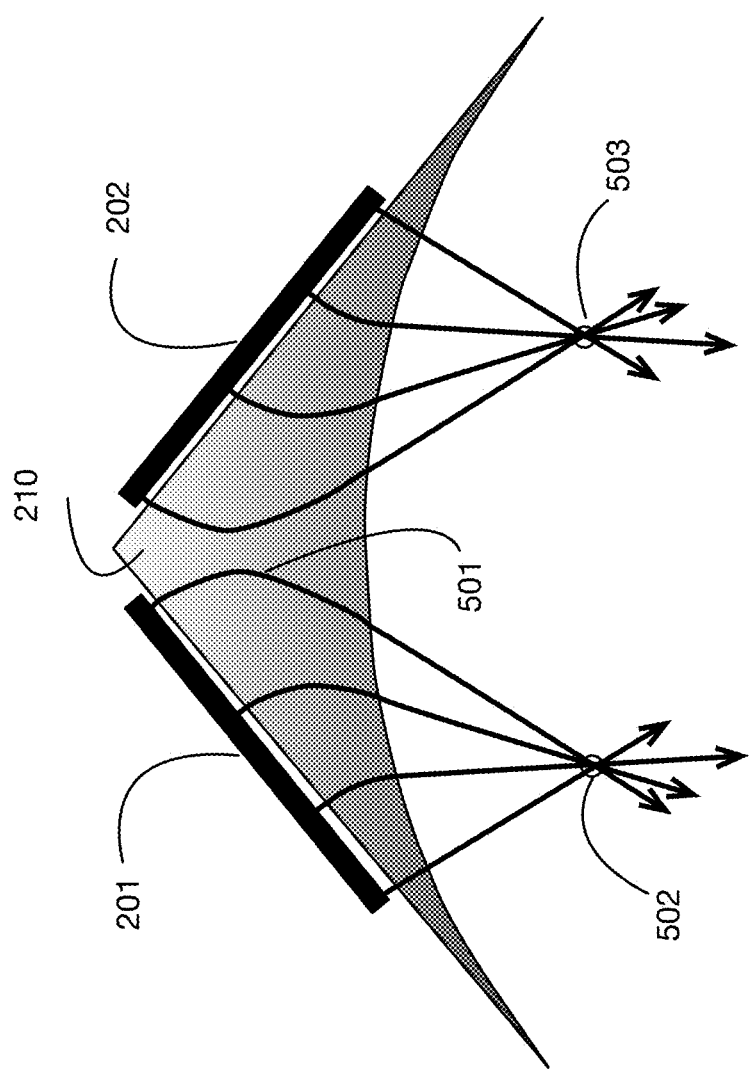
FIG. 5 shows a cross sectional view of the embodiment shown in FIG. 4, illustrating how the lens bends light rays emitted from the displays.

FIG. 5 shows a top view of an embodiment of the displays 201 and 202, and the lens 210. In this embodiment the lens is a gradient index lens, where the index of refraction of the lens changes continuously throughout the lens volume. One or more embodiments may use gradient index optics for one or more of the lenses of the system. An advantage of gradient index optics is that light rays can be bent significantly and in highly versatile ways using a relatively thin lens. For example, light can be focused in the middle area of a gradient index lens, but deflected outward at the edges of the lens to fill the user's peripheral field of vision. The gradient index lens entry and exit zones (layers) may also act as a collimator and optical relay to reduce the effect of non-parallel rays which would degrade the image. One or more embodiments may use Fresnel lenses. Fresnel lenses also provide the advantage of being relatively thin. Embodiments may use any type of lens or lenses between the displays and the user's eyes. One or more embodiments may use combinations of different types of lenses. One or more embodiments may use one or more holographic optical elements to diffract, reflect, or transmit light in any desired pattern. Holographic optical elements may be used for example in conjunction with other lenses, or in place of certain lenses.

In a simple lens consisting of uniform material, refraction of light rays occurs only at the lens surfaces. In a gradient index lens, such as the lens 210 in FIG. 5, refraction may occur throughout the lens due to continuous variations in the index of refraction of the lens material. For example, light ray 501 bends throughout the lens material 210, and not just at the boundaries of the lens. One or more embodiments may use any lens or combination of lenses to bend light in any desired manner, in order to form images of any shape and size. In the embodiment of FIG. 5, lens 210 focus the light rays from left display 201 onto point 502, which may for example be at or near the left eye of the user, and it focuses the light rays from right display 202 onto point 503, which may for example be at or near the right eye of the user.

Figure 6:
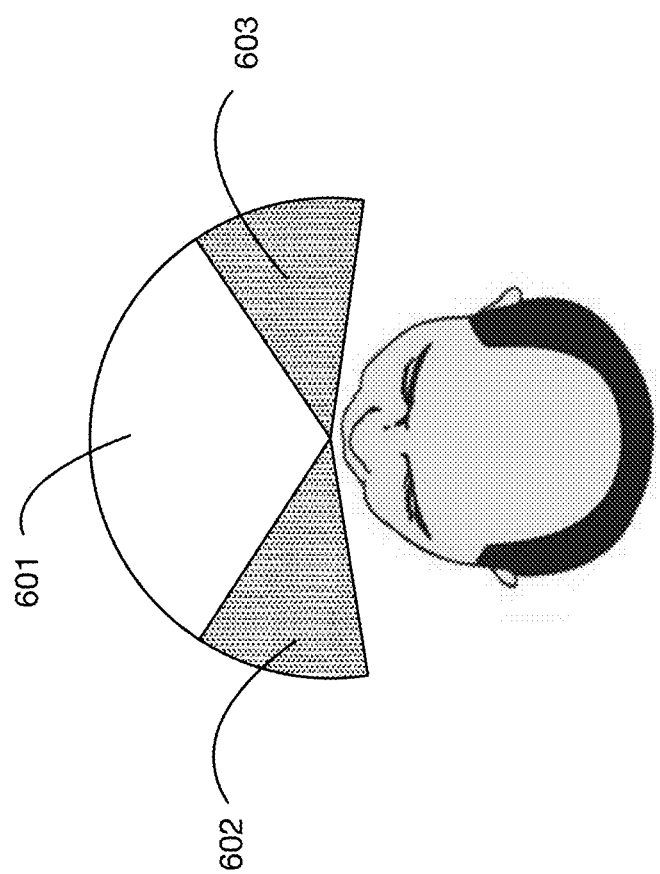
FIG. 6 illustrates the high resolution central field of view of a user, and the relatively low resolution peripheral field of view of the user.

One or more embodiments may optimize or otherwise configure the display and lens system to reflect the variable resolution of human vision in different portions of the field of view. FIG. 6 illustrates this variable resolution. Human vision has relatively high resolution in the central region 601 of the field of view, and relatively poor resolution in the peripheral regions 602 and 603. High resolution display or images in the peripheral regions of the field of view may therefore add little or nothing to the user's experience. However, for an immersive experience, it is preferable to provide some image across the user's entire field of view.

Figure 7:
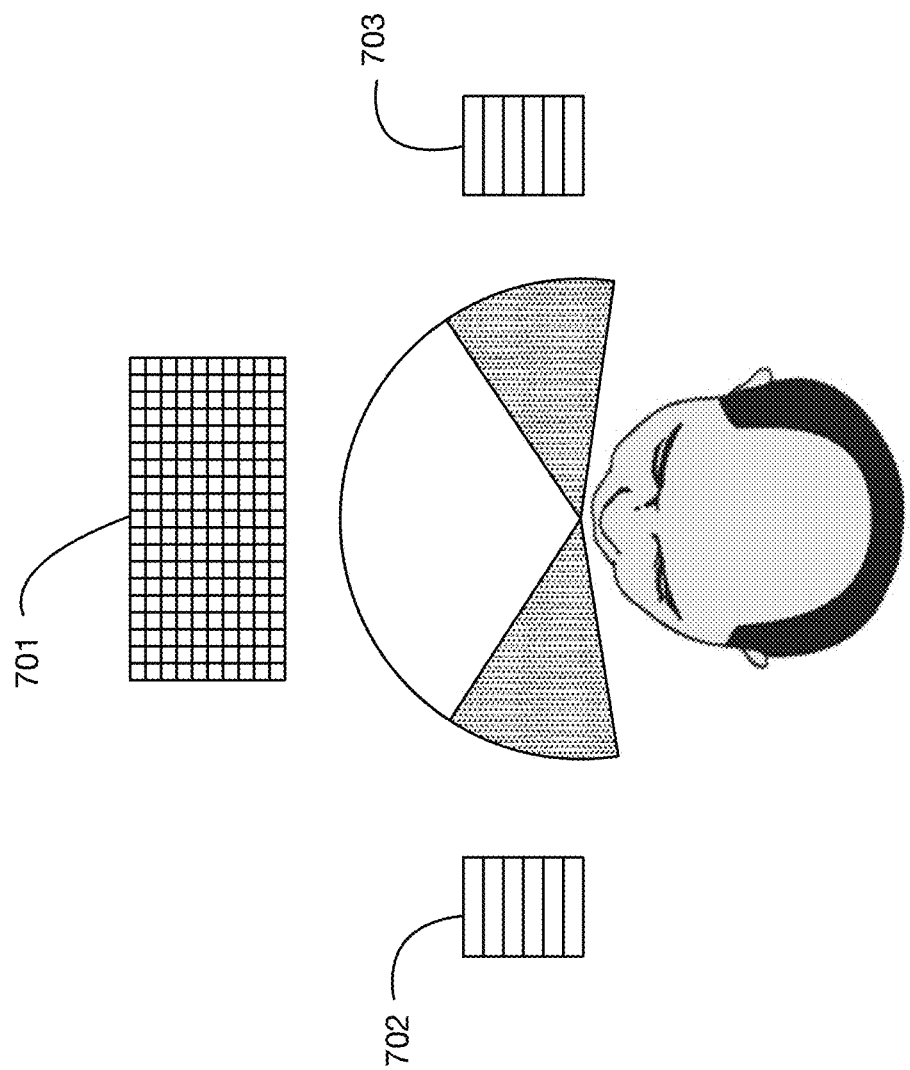
FIG. 7 illustrates an embodiment of the system that provides a high resolution display for the central portion of a user's field of view, and low resolution display for the peripheral portion of the user's field of view.

FIG. 7 illustrates a conceptual approach employed by one or more embodiments to optimize the display system to reflect the variable resolution across the field of view. In the central region of the field of view, a high resolution display 701 is provided. In the peripheral left and right regions of the field of view, low resolution displays 702 and 703 are provided. In the embodiment illustrated in FIG. 7, the peripheral displays have only vertical resolution and they are horizontally uniform. One or more embodiments may use peripheral displays with horizontal resolution as well as or instead of vertical resolution. Embodiments may use any desired density for central and peripheral displays. The technologies used to generate displays or images for the central region may be different from those used for the peripheral regions in one or more embodiments. For example, an embodiment may use a standard rectangular pixel display for the central region, and use LEDs or other light emitting devices at a low resolution for the peripheral regions. The light emitting devices for peripheral regions may for example project coarse or diffuse light towards the peripheral areas of the viewing device. The intensity and color of the diffuse light in the peripheral regions may be determined for example based on average luminance or color values in peripheral regions of the scene being displayed.

Figure 8:
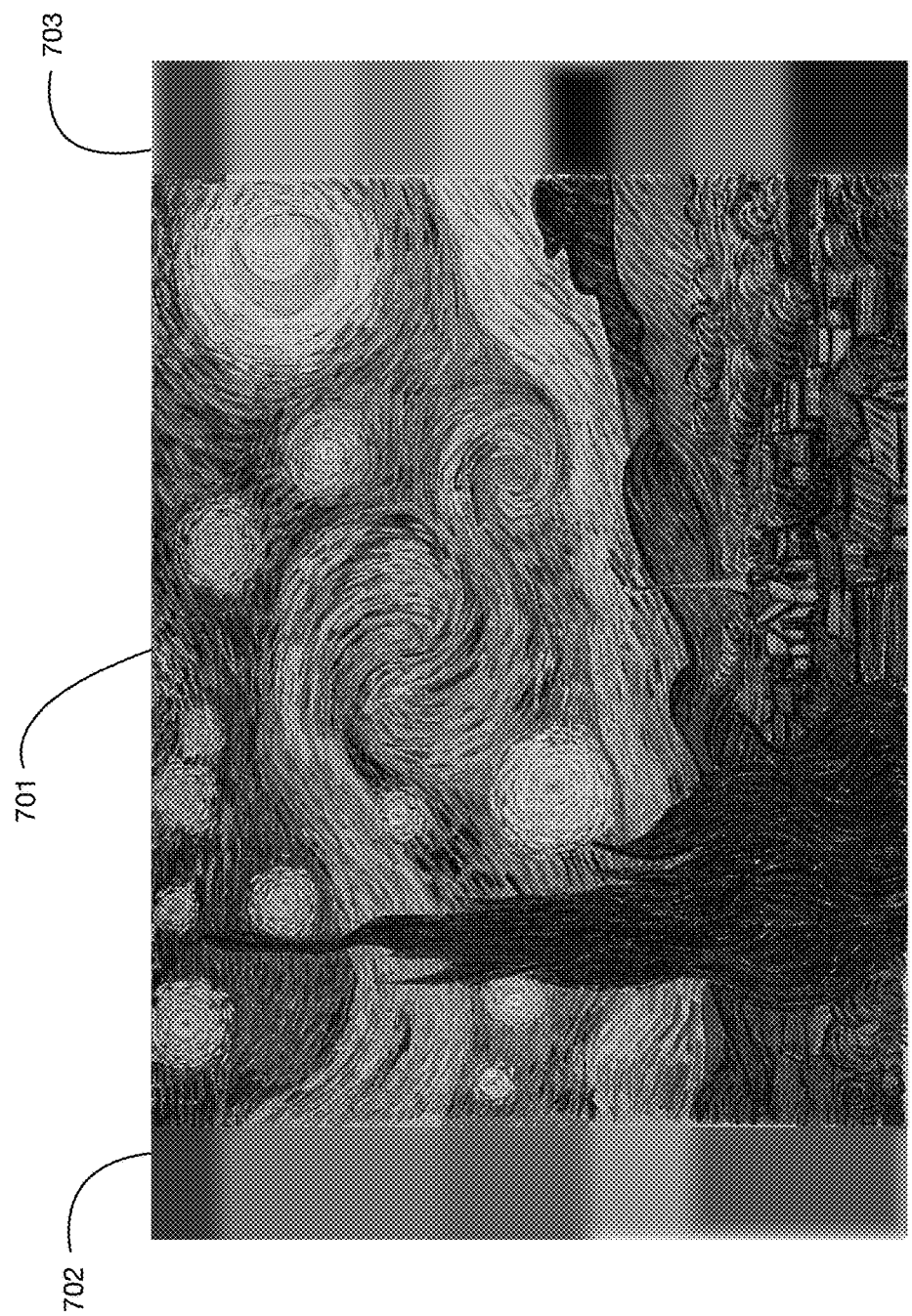
FIG. 8 illustrates an image as viewed for example in an embodiment of the system as illustrated in FIG. 7.

FIG. 8 illustrates an image that may be produced by one or more embodiments that uses low resolution images in the peripheral regions. In this illustrative example, the central area 701 of the image has significant vertical and horizontal resolution. The left and right peripheral regions of the image 702 and 703 in this example have no horizontal resolution, and relatively low vertical resolution.

Figure 9:
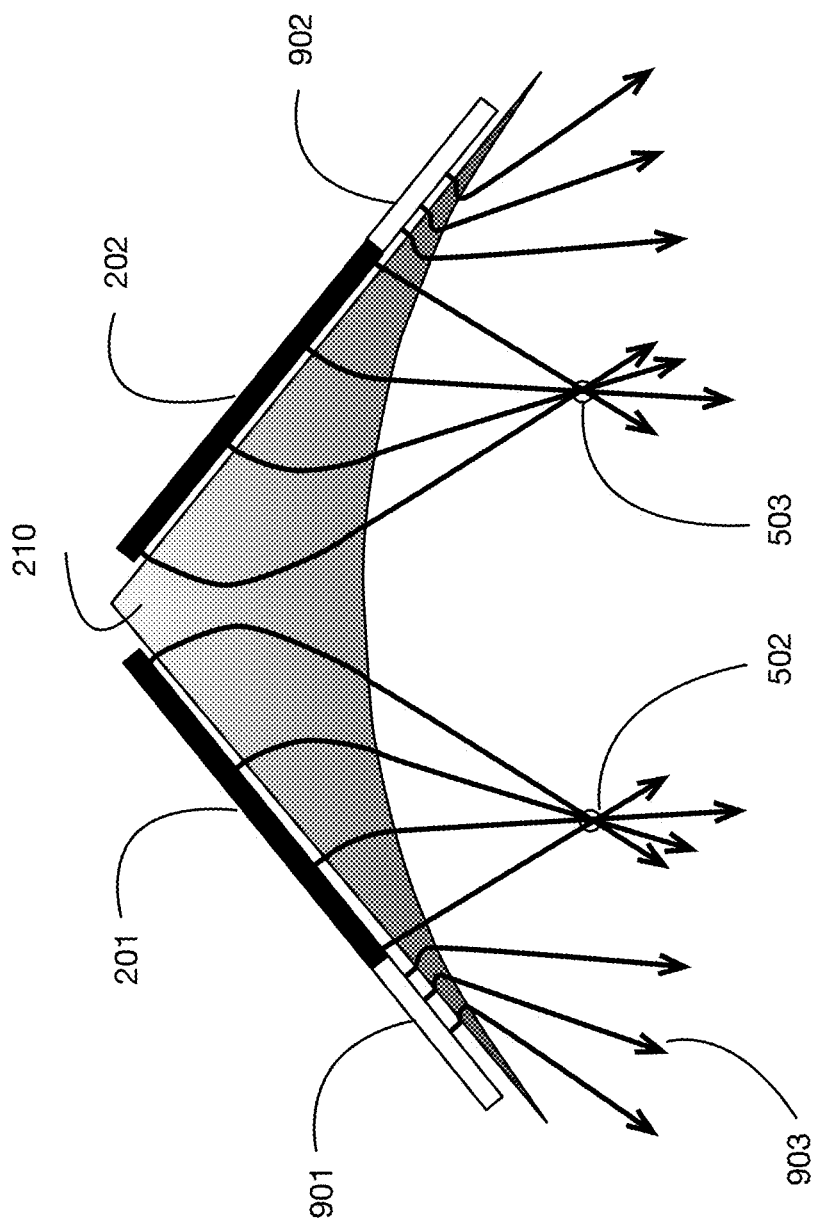
FIG. 9 illustrates an embodiment of the system that provides potentially lower resolution diffuse light for the peripheral vision regions of the user's field of view, using a lens to project unfocussed light towards the periphery.

One or more embodiments may use a lens or combination of lenses to direct the peripheral light or peripheral images towards the edges of the viewing device. FIG. 9 illustrates an embodiment that extends the example shown in FIG. 5 to generate unfocused images in the periphery of the user's field of view. This embodiment has a left peripheral display region 901 to the left of display 201, and a right peripheral display region 902 to the right of display 202. In one or more embodiments a peripheral display region may be part of an integrated display that includes for example both 201 and 901. In one or more embodiments the peripheral display regions may instead be separate devices, such as for example lower resolution displays or arrays of individual light emitting devices. The lens 210, which may for example be a gradient index lens, bends the light from the peripheral display regions outward towards the edges of the viewing device. These light rays may for example not converge at the focal points 502 and 503. For example, light ray 903 from left peripheral display region 901 is bent outward by lens 210 and it does not converge on focal point 502. The user may therefore view the images from regions 901 and 902 as diffuse, unfocused light rather than as focused high resolution pixels.

Figure 10:
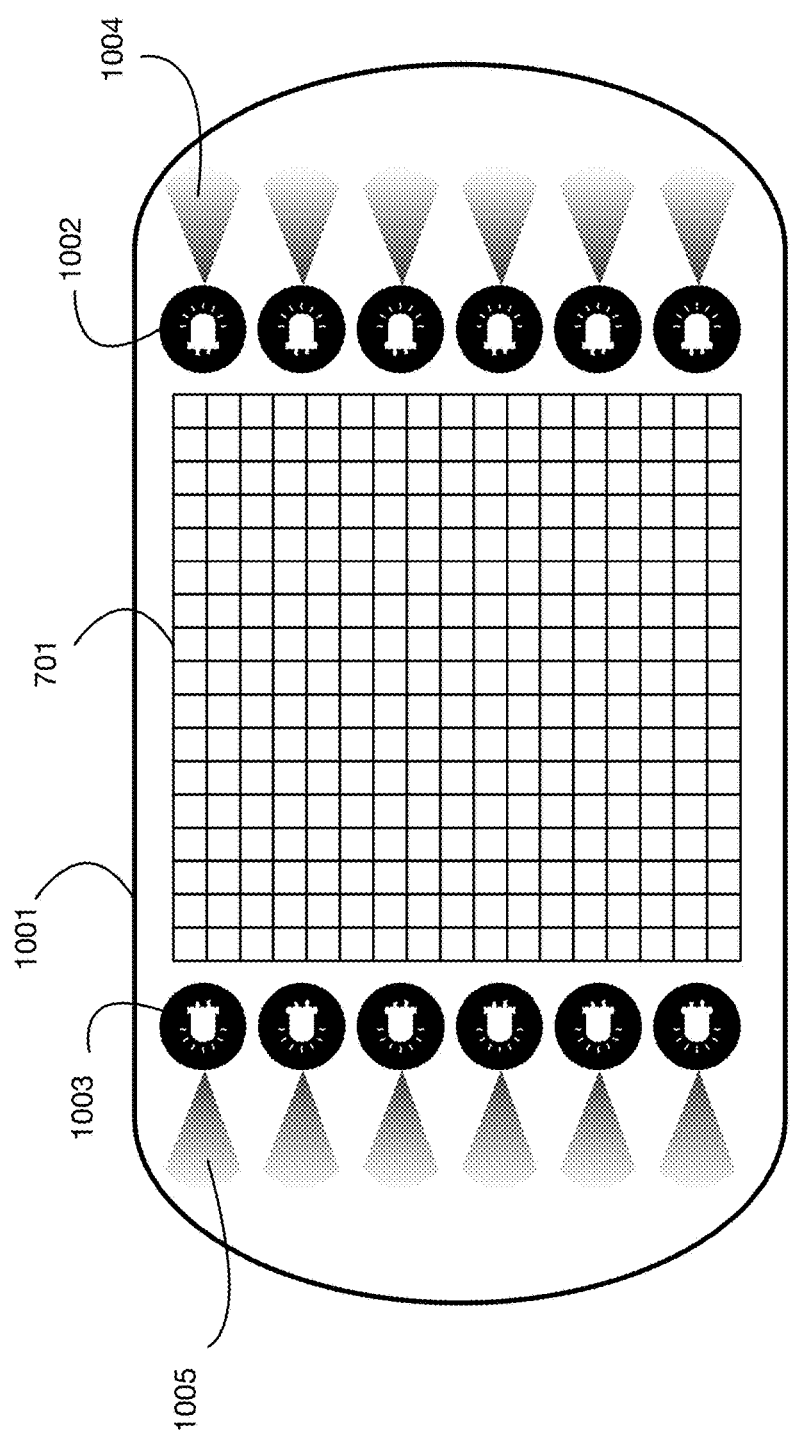
FIG. 10 illustrates an embodiment of the system that has a central display and a series of low-resolution, vertically spaced peripheral light pixels to the left and right of the central display.

One or more embodiments of the system may use peripheral light emitters with or without lenses. FIG. 10 illustrates an embodiment of the system front viewable area 1001 positioned in front of the eyes of a user. This area includes a high resolution central display 701, and two columns of peripheral light pixels to the left and right of the central display. Each peripheral light pixel directs light towards the periphery of the user's field of view. For example, right peripheral light pixel 1002 directs light 1004 towards the right of the user's field of view, and left peripheral light pixel 1003 directs light 1005 towards the left of the user's field of view. Embodiments may use any number, size, configuration, location, technology, and density of peripheral light pixels. Embodiments may also use any number, size, configuration, location, technology, and density of central displays. Because of the differences in resolution between a user's central field of view and peripheral field of view, as illustrated for example in FIG. 6, one or more embodiments may use relatively lower density of peripheral light pixels compared to the density of pixels in the central display or displays. One or more embodiments may use peripheral light pixels that emit diffuse light.

Figure 11:
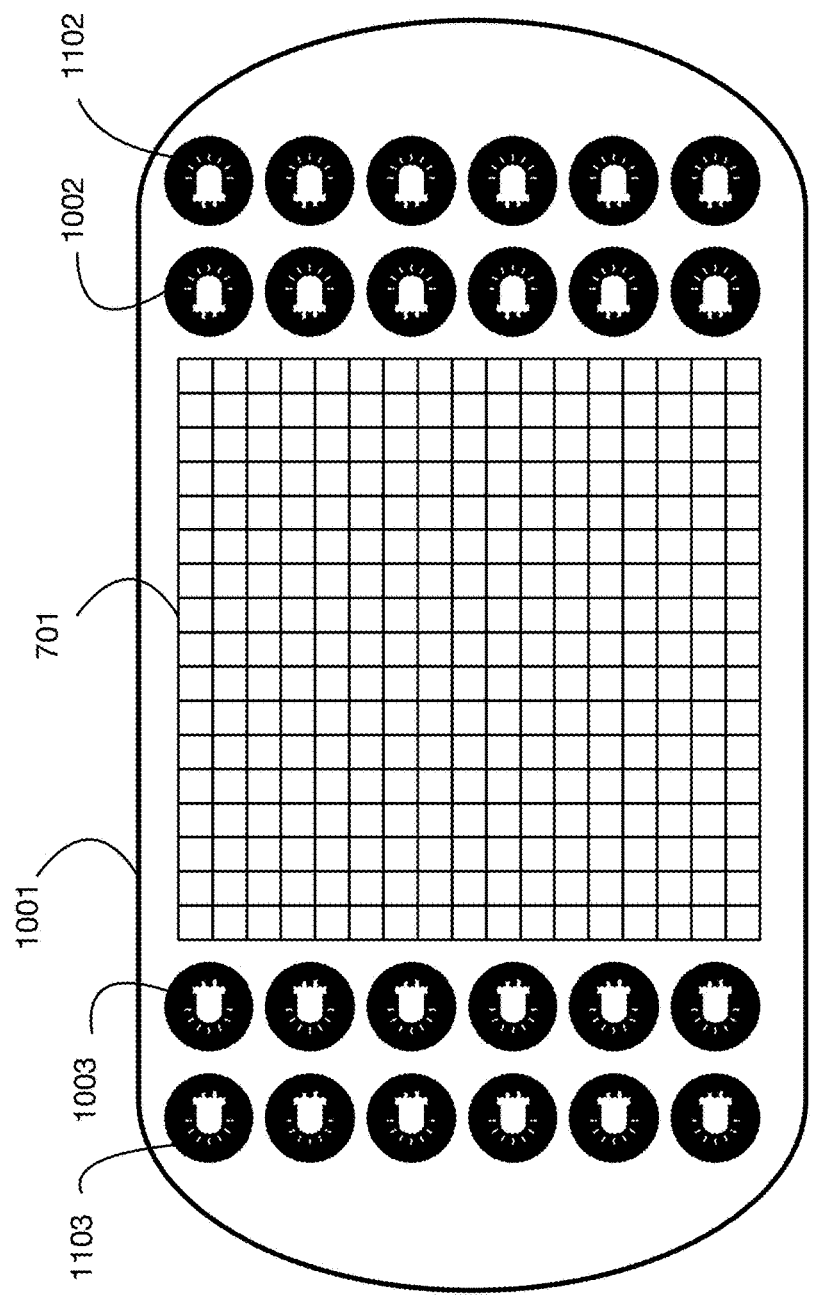
FIG. 11 illustrates a variation of the embodiment shown in FIG. 10, with multiple vertical columns of peripheral light pixels on either side of the central display.
Figure 12:
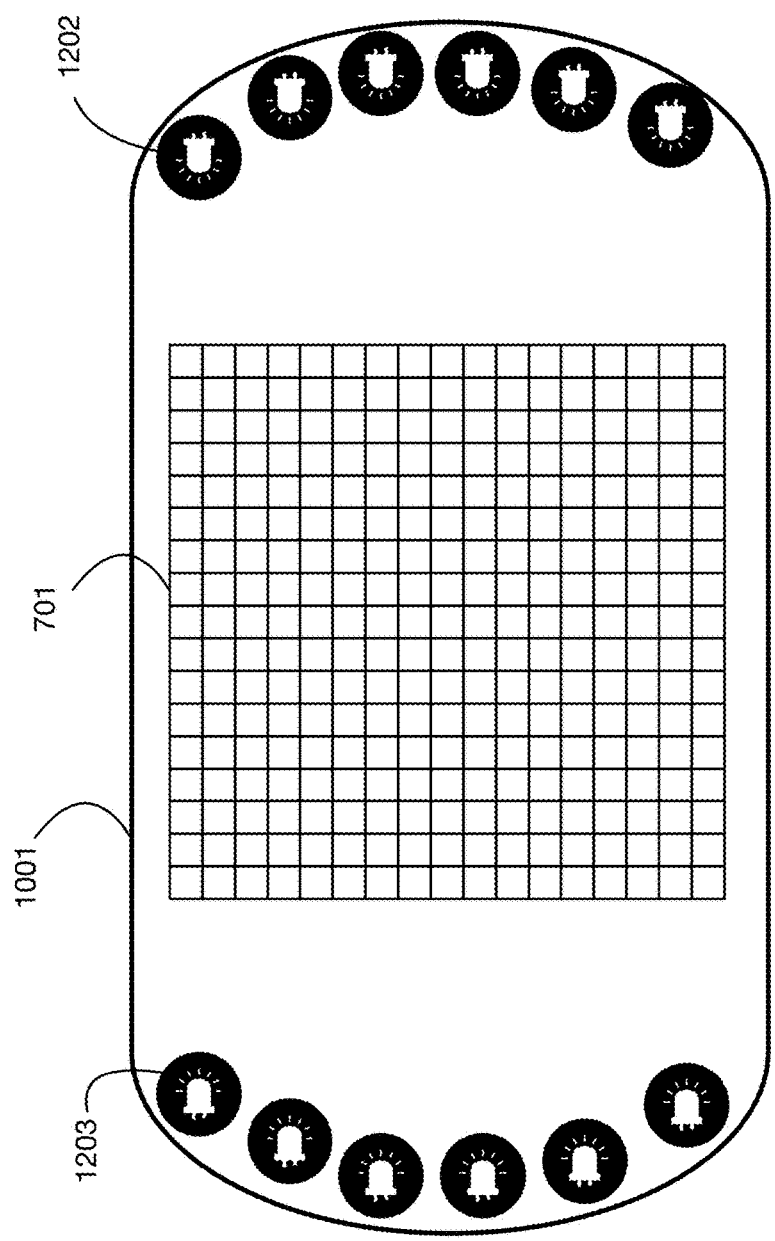
FIG. 12 illustrates a variation of the embodiment shown in FIG. 10, with peripheral light pixels positioned at the outer edges of the viewable area of the mount.
Figure 13:
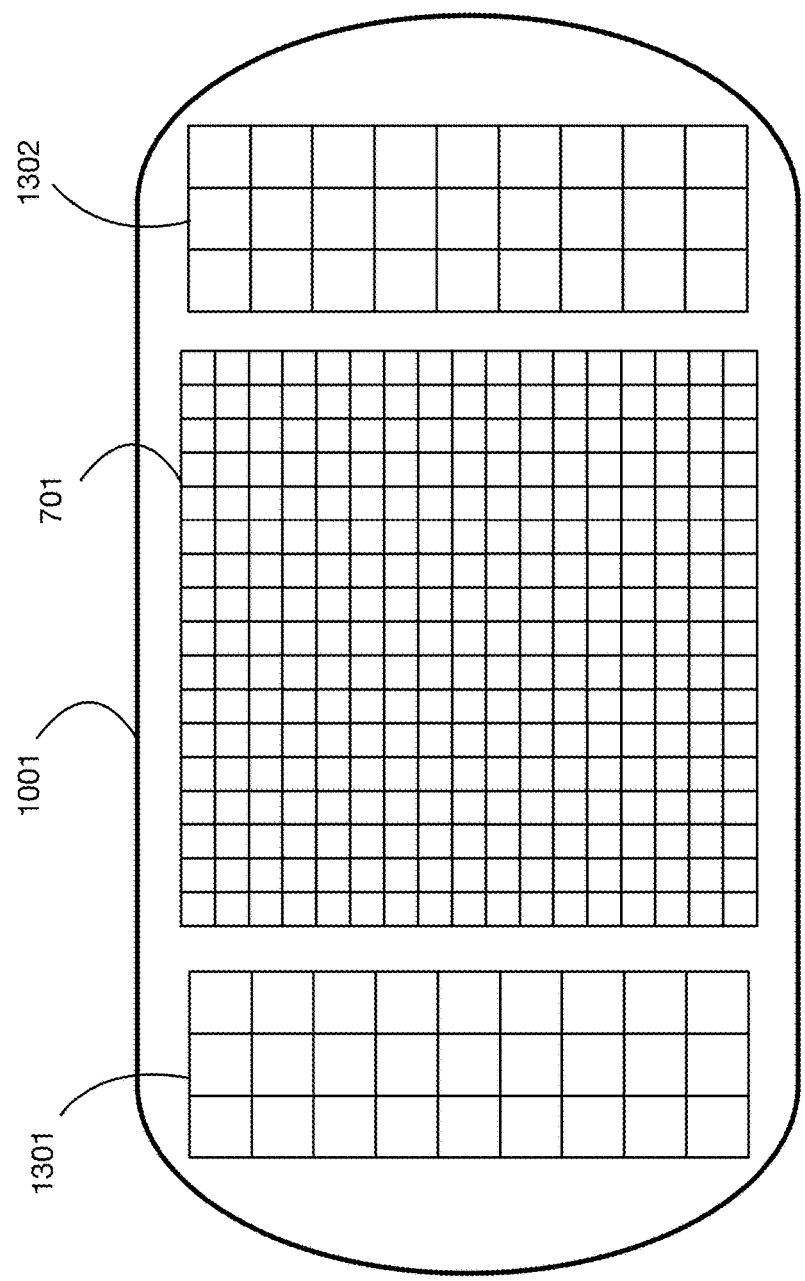
FIG. 13 illustrates a variation of the embodiment shown in FIG. 10, with a left and right low-resolution display on the sides of the higher resolution central display.

The configuration of peripheral light pixels shown in FIG. 10 is illustrative; FIGS. 11, 12, and 13 show some exemplary variations on this configuration that may be used in one or more embodiments. In FIG. 11 there are two columns of peripheral light pixels on each side of the central display 701—such as pixels 1002 and 1102 on the right and pixels 1003 and 1103 on the left. This configuration provides a very coarse horizontal resolution on the periphery, with a higher vertical resolution which is still below the vertical resolution of the central display 701. In FIG. 12 the peripheral light pixels are positioned at the outer edges of the viewable area 1101, such as right peripheral light pixel 1202 and left peripheral light pixel 1203. These peripheral light pixels may for example direct light inward rather than outward. In FIG. 13 low-resolution rectangular displays 1301 and 1302 are used for peripheral light emitters. These peripheral displays may for example be for example LCD screens, OLED screens, or any other display technology. These configurations shown in FIGS. 10, 11, 12, and 13 are illustrative; embodiments may configure peripheral light emitters and their peripheral light pixels in any desired configuration or pattern.

Figure 14:
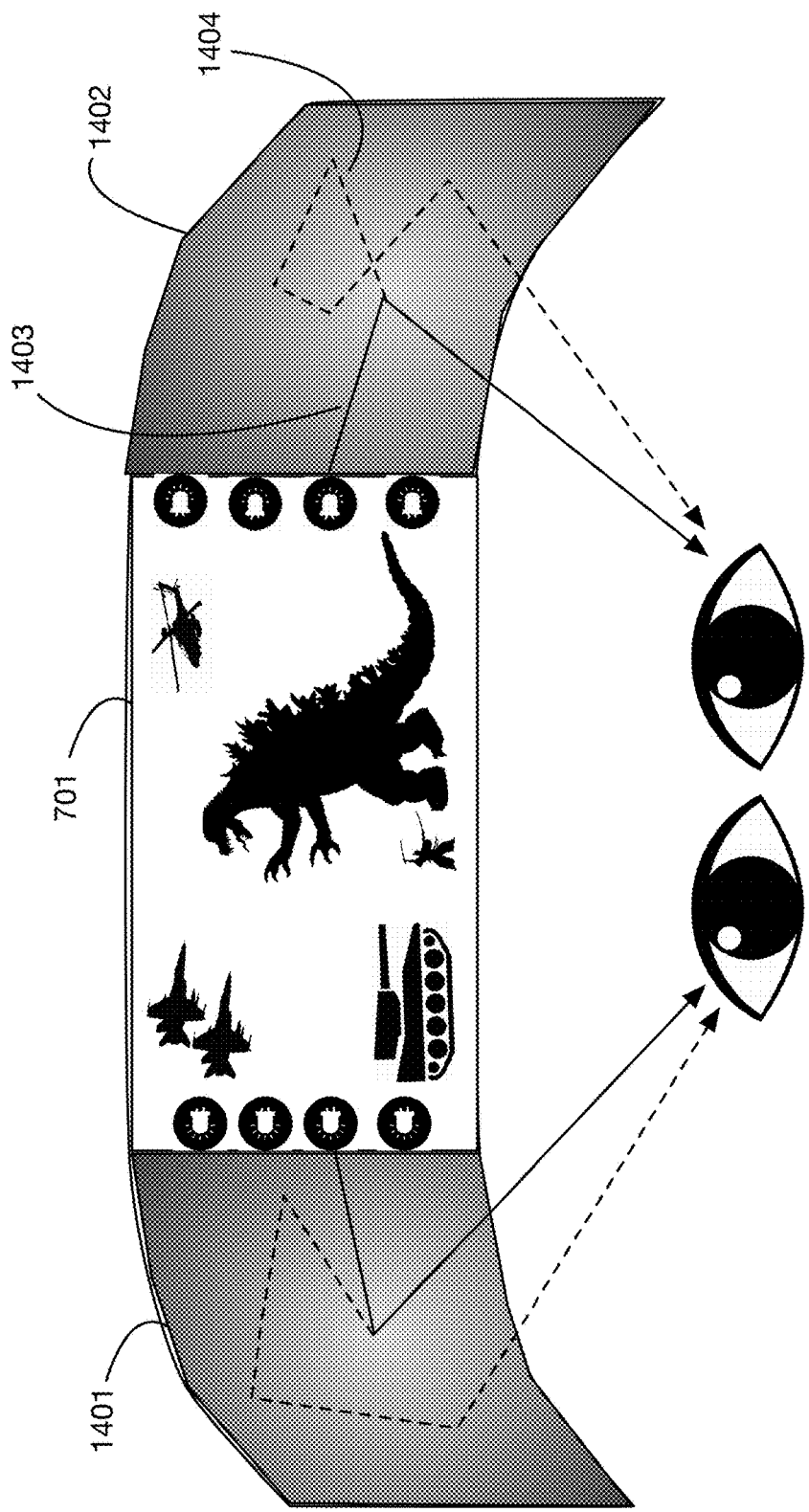
FIG. 14 illustrates an embodiment of the system with reflective left and right edges that reflect light from the peripheral light emitters towards the user's eyes.

FIG. 14 illustrates an embodiment of the system with a single central display 701, a left reflective surface 1401, and a right reflective surface 1402. These reflective surfaces may for example provide specular or diffuse reflection to generate peripheral light of any desired pattern and intensity. An illustrative light ray 1403 is emitted by a peripheral light pixel, and it reflects off the surface towards the user's right eye. In addition, one or more secondary rays such as 1404 may be reflected in other directions, and some of these secondary rays may also be reflected eventually back towards the eye of the user. The effect of these multiple reflections may be to create a diffuse pattern of light that fills all or a significant portion of the user's peripheral field of view.

Figure 15:
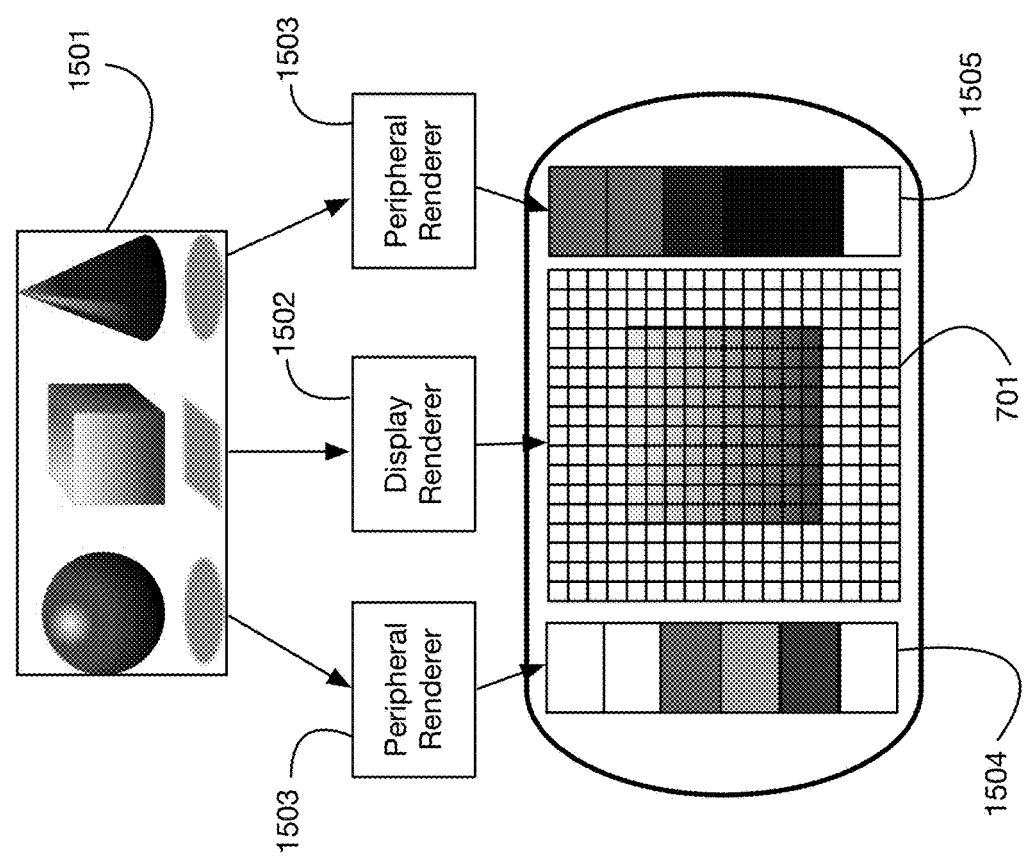
FIG. 15 illustrates an embodiment of the system that includes a display renderer to render display pixels from a 3D scene, and a peripheral renderer to render peripheral light pixels from the 3D scene.

FIG. 15 illustrates an embodiment of the system that uses a display renderer 1502 and a peripheral renderer 1503 to generate central images and peripheral light from 3D model 1501 of a scene. In this example the display renderer 1502 generates a relatively high resolution image for the central display 701, and the peripheral renderer uses an approximation to generate a low resolution image for the left peripheral light pixels 1504 and the right peripheral light pixels 1505.

Figure 16:
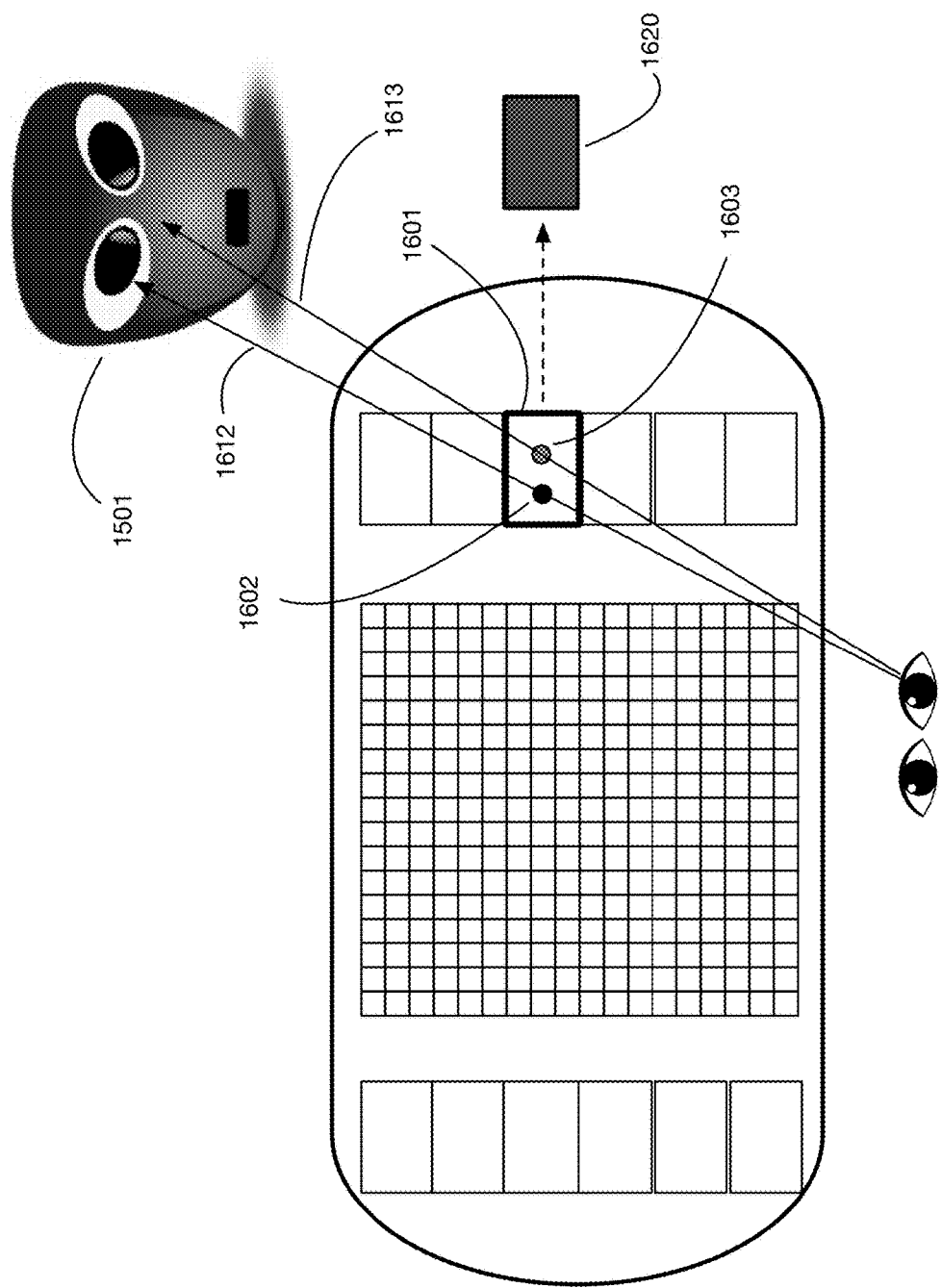
FIG. 16 illustrates an embodiment of a peripheral renderer that sets a peripheral light pixel color by sampling points within an area associated with the pixel, and averaging the color of the sampled points.
Figure 17:
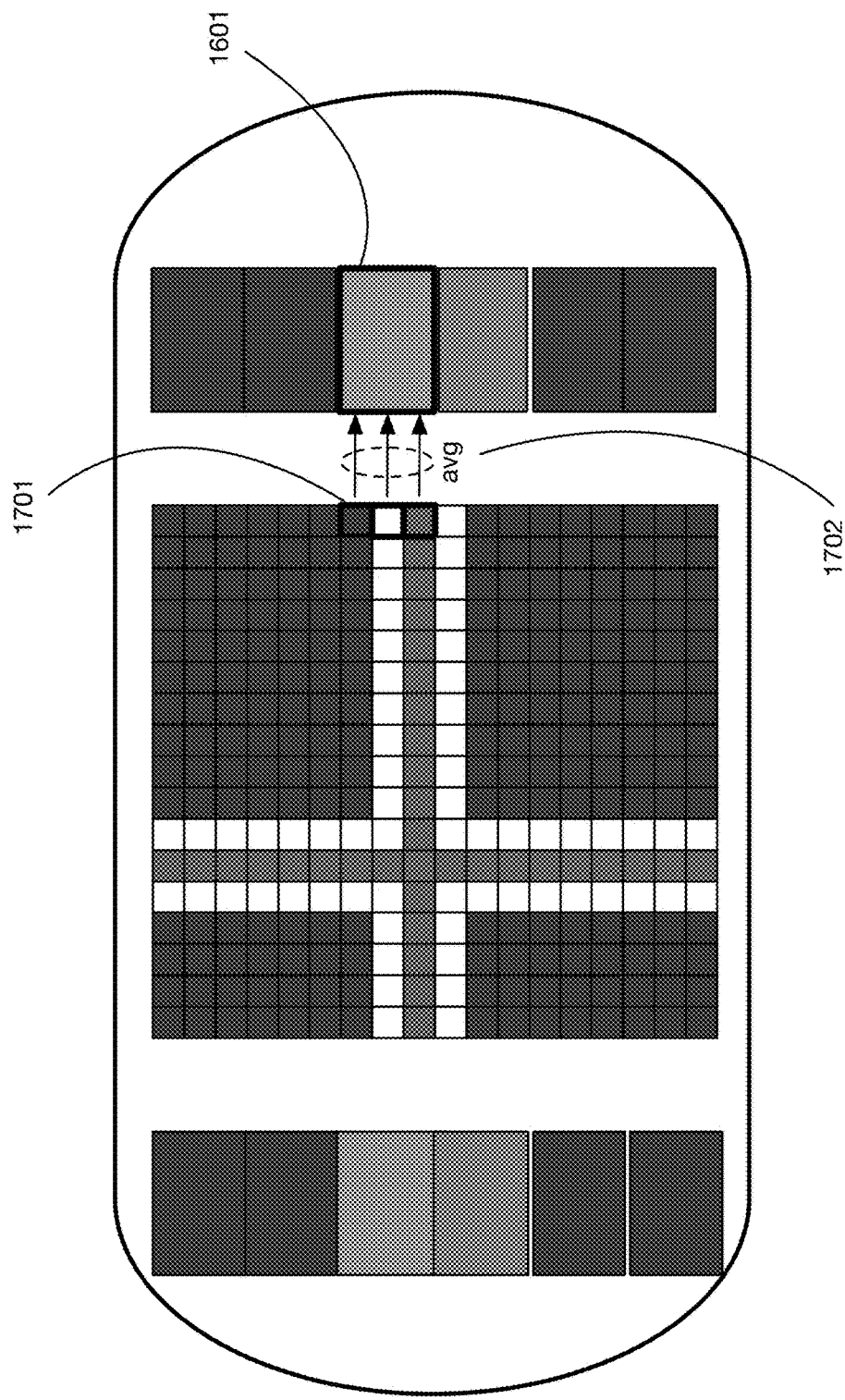
FIG. 17 illustrates an embodiment of a peripheral renderer that sets a peripheral light pixel color by averaging the colors of the adjacent pixels in a central display.

One or more embodiments may use any desired approximations for peripheral rendering. Two illustrative approximations are shown in FIG. 16 and FIG. 17. FIG. 16 illustrates an embodiment that determines the color of each peripheral light pixel by raycasting through a set of sample points located within an area associated with the peripheral light pixel, and then averaging the colors obtained on each cast ray. In this example two sample points 1602 and 1603 are selected in peripheral light pixel area 1601. The area used for sampling points may for example correspond to the physical size of the peripheral light pixel, or it may for example correspond to a region illuminated by this peripheral light pixel (or to a portion of this region). Embodiments may associate any desired area with each peripheral light pixel in order to determine the color of the peripheral light pixel. Embodiments may use any number of sample points within each peripheral light pixel area; two sample points are shown here for illustration. Ray 1612 is drawn from the user's right eye through sample point 1602; the first object in 3D model 1501 intersected by this ray determines the color selected for this sample point, which in this case is black. Similarly ray 1613 is drawn from the user's right eye through sample point 1603, determining a blue color. These two colors are averaged to form color 1620, a dark blue, for this peripheral light pixel. One or more embodiments may combine sampled colors in any desired manner, including for example, without limitation, simple averaging, weighted averaging, maximizing, minimizing, random selection, or any other procedure.

FIG. 17 illustrates another approximation technique that may be used for peripheral rendering in one or more embodiments. In this example, the color of each peripheral light pixel is determined based on the colors of display pixels that are adjacent to or close to the peripheral light pixel. This approximation may be very efficient since the display renderer has already calculated the pixel colors for the display or displays. Thus very little additional calculation is needed in this example to determine the color of each peripheral light pixel. In FIG. 17, peripheral light pixel 1601 is adjacent to the three display pixels 1701, which have colors red, white, and blue. The embodiment shown in FIG. 17 takes an average color value 1702 from the adjacent display pixels and assigns this color value to the peripheral light pixel 1601. One or more embodiments may combine colors from display pixels in any desired manner, including for example, without limitation, simple averaging, weighted averaging, maximizing, minimizing, random selection, or any other procedure.

The examples of peripheral rendering approximations shown in FIGS. 16 and 17 are illustrative; any technique for generating the color of peripheral light pixels from the 3D model of a scene is in keeping with the spirit of the invention.

Figure 18:
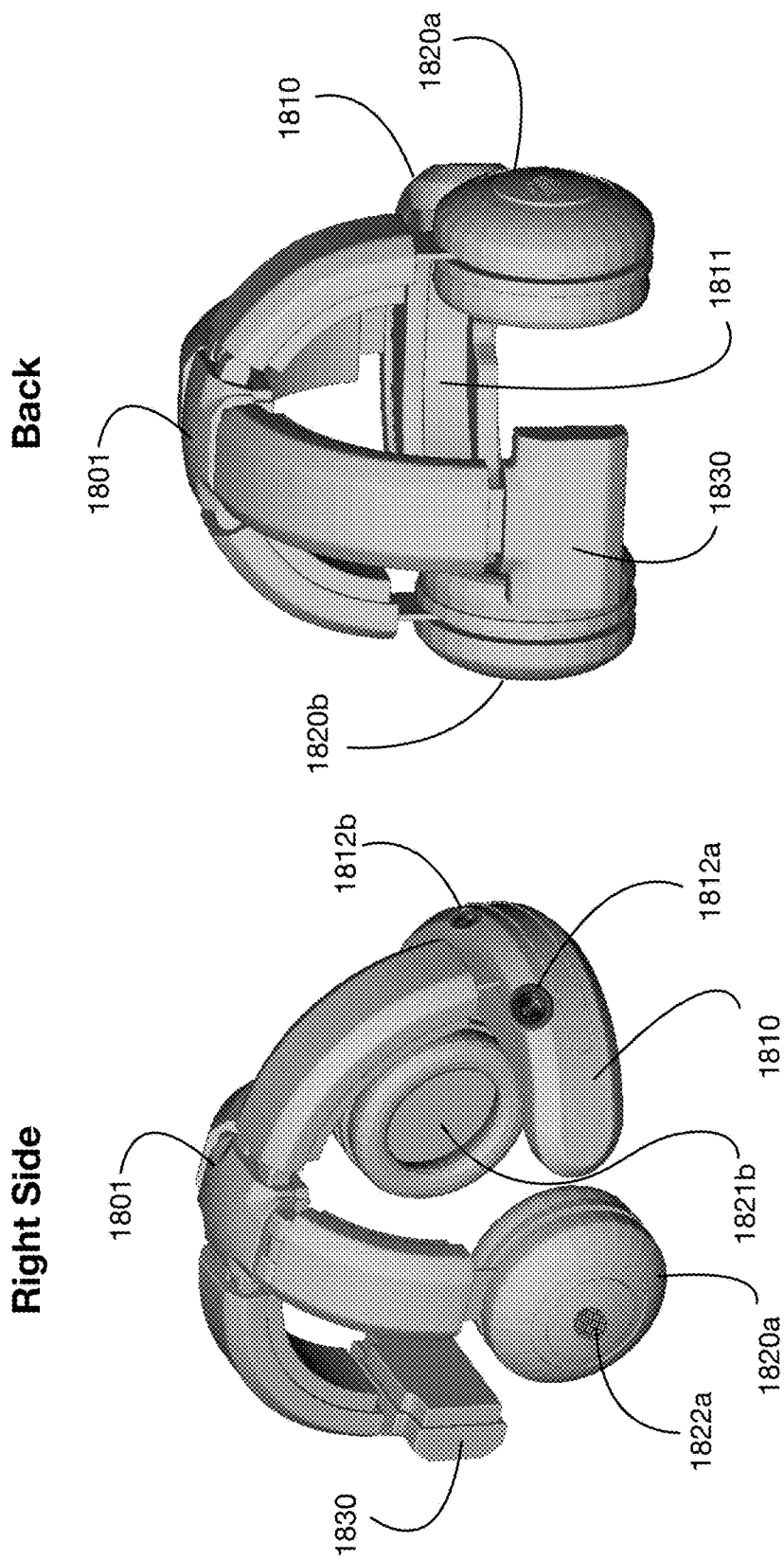
FIG. 18 illustrates an embodiment of the system with a head mount, an attached modular display at the front, attached modular headphones at the sides, and an attached modular sensor in the back.

One or more embodiments of the system may comprise a mount attached to a user's head, with modular display, audio, or sensor components attached to the mount. FIG. 18 shows a right side view and a back view of an embodiment with a mount 1801 that fits on the user's head. A swappable modular display 1810 is attached to the front of mount 1801; this modular display has a display screen 1811 viewed by the user, and front-facing cameras 1812a and 1812b. One or more embodiments may comprise any number of swappable display modules. Embodiments of the system may have a standard interface, or multiple standard interfaces, allowing modules to be exchanged by the user. These interfaces may comprise both mechanical interfaces and electronic interfaces. One or more embodiments may have certain fixed components in combination with selected modular components; embodiments may provide modularity for any or all of the system components. One or more embodiments may function without certain modular components installed at all. For example, in the embodiment shown in FIG. 18, a user may choose to not install a modular display 1810, and to use the system only for its speakers, for example. Any number of components or modular elements may be optional. The two cameras 1812*a* and 1812*b* shown in FIG. 18 are illustrative. One or more embodiments may use only a single camera, no cameras, or more than two cameras. The illustrative embodiment shown in FIG. 18 has the cameras and display screens integrated into a single swappable display module. One or more embodiments may have separate swappable modules for cameras and for display screens. The embodiments shown in FIG. 18 comprises a cross-shaped mount 1801 fitting over the user's head. This design is illustrative; embodiments may use mounts of any shape, size, and configuration.

The embodiment shown in FIG. 18 also includes swappable audio modules 1820*a* and 1820*b*. Module 1820*b* is shown with speaker 1821*b*. Module 1820*a* is shown with microphone 1822*a*. Embodiments of the system may use any number of speakers and microphones for swappable audio modules. One or more embodiments may use no microphones, or any number of microphones in any configuration. Audio modules may be optional in one or more embodiments. The configuration shown provides one audio module around each ear; one or more embodiments may have only a single audio module positioned for example next to one of the user's ears. The illustrative embodiment shown in FIG. 18 has the speakers and microphones integrated into swappable audio modules. One or more embodiments may have separate swappable modules for speakers and for microphones. One or more embodiments may combine audio modules and display modules, or components thereof, in any desired manner. For example, one or more embodiments may integrate one or more microphones into display modules, rather than into audio modules as shown in the illustrative embodiment in FIG. 18. Embodiments may organize components into swappable modules in any desired manner.

The embodiment shown in FIG. 18 also includes swappable sensor module 1830. This module may for example include sensors to measure the user's orientation or position, or changes thereof. For example, sensors may include, without limitation, gyros, accelerometers, magnetometers, GPSs, ultrasonic rangefinders, infrared rangefinders, pressure sensors, flow meters, altimeters, or any other sensing device. Sensors may also include devices to measure biological functions of the users, such as for example pulse, blood pressure, sweat, muscle tension, muscle movement, or nerve impulses. Different swappable sensor modules may include different numbers and types of sensors. The embodiment shown in FIG. 18 positions the sensor module 1830 at the back of the mount 1801. This configuration is illustrative; embodiments may locate a swappable sensor module or modules in any desired location. Sensor modules may also be combined with display modules, audio modules, or any other component in any desired manner. Swappable sensor modules may be used for example to provide the user's position or orientation to a virtual reality rendering subsystem that renders display views or audio or both based on this position or orientation.

Figure 19:
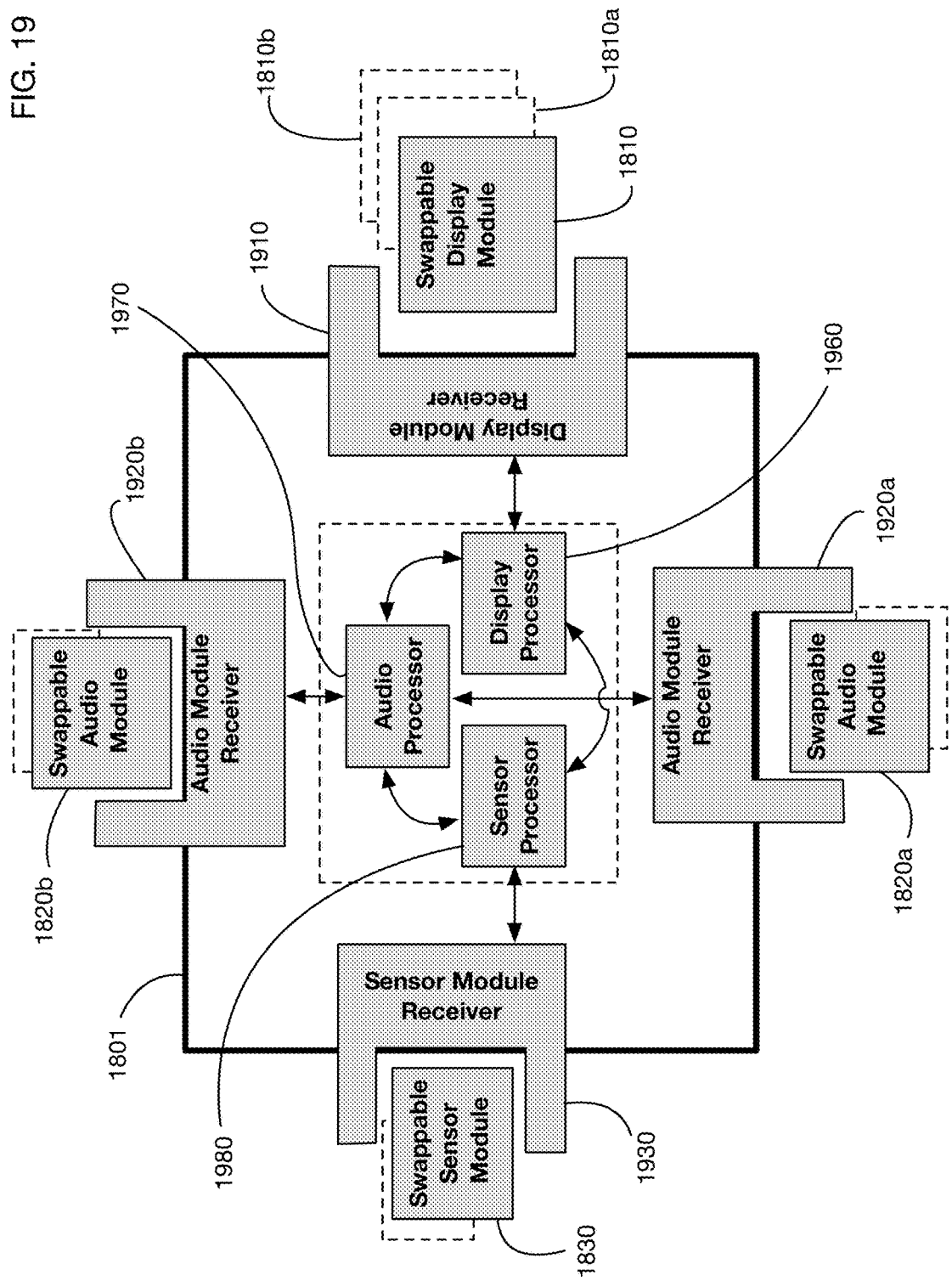
FIG. 19 illustrates an architectural block diagram of the embodiment shown in FIG. 18, showing the swappable modular components and the receivers into which they may be inserted.

FIG. 19 illustrates an architectural block diagram of the embodiment shown in FIG. 18. Mount 1801 contains receivers for the swappable modular components. These receivers provide mechanical and electronic interfaces that mate with the corresponding swappable modular components. Integrated into or otherwise in communication with mount 1801 are several processors that manage the flow of data to and from these swappable modular components. FIG. 19 illustrates three processors: display processor 1960, audio mixing processor 1970, and sensor processor 1980. These processors have communication links among them to coordinate the audio and display data with the sensor data. This configuration is illustrative; embodiments may use any number and configuration of processors to manage communication with the various system components, including with the swappable display, audio, and sensor modules. These processors may be for example, without limitation, microprocessors, microcontrollers, special purpose circuitry, digital signal processors, FPGAs, analog or digital circuits, or any other computing or processing elements. In one or more embodiments the processing functions of the system may be performed by one or more processors that are external to the mount, such as for example computers or mobile devices that are in communication with the electronics in the mount. In one or more embodiments the display processor, the audio processor, and the sensor processor may be the same device.

Display module receiver 1910 accepts swappable display module 1810, as well as other embodiments of the swappable display module such as 1810*a* and 1810*b*. When any swappable display module is inserted into or otherwise coupled to the display module receiver 1910, a communication path is established between the display processor 1960 and the swappable display module. Any number of swappable display modules may be provided with the system, or added to the system at any time. FIG. 19 illustrates a single display module receiver 1910; one or more embodiments may have any number of display module receivers.

Audio module receivers 1920*a* and 1920*b* accepts swappable audio modules 1810*a* and 1820*b*, respectively, as well as other embodiments of the swappable audio modules. When any swappable audio module is inserted into or otherwise coupled to an audio module receiver such as 1920*a* or 1920*b*, a communication path is established between the audio mixing processor 1970 and the swappable audio module. Any number of swappable audio modules may be provided with the system, or added to the system at any time. FIG. 19 illustrates two audio module receivers 1920*a* and 1920*b*; one or more embodiments may have any number of audio module receivers.

Sensor module receiver 1930 accepts swappable sensor module 1830, as well as other embodiments of the swappable sensor module. When any swappable sensor module is inserted into or otherwise coupled to the sensor module receiver 1930, a communication path is established between the sensor processor 1980 and the swappable sensor module. Any number of swappable sensor modules may be provided with the system, or added to the system at any time. FIG. 19 illustrates a single sensor module receiver 1930; one or more embodiments may have any number of sensor module receivers.

The architecture shown in FIG. 19 is illustrative. Embodiments of the system may include any desired number and configuration of receivers for swappable system components, and any desired number and configuration of processors to manage communication with these components. In one or more embodiments some of the components may be fixed rather than swappable. In one or more embodiment some of the components may be optional.

Figure 20:
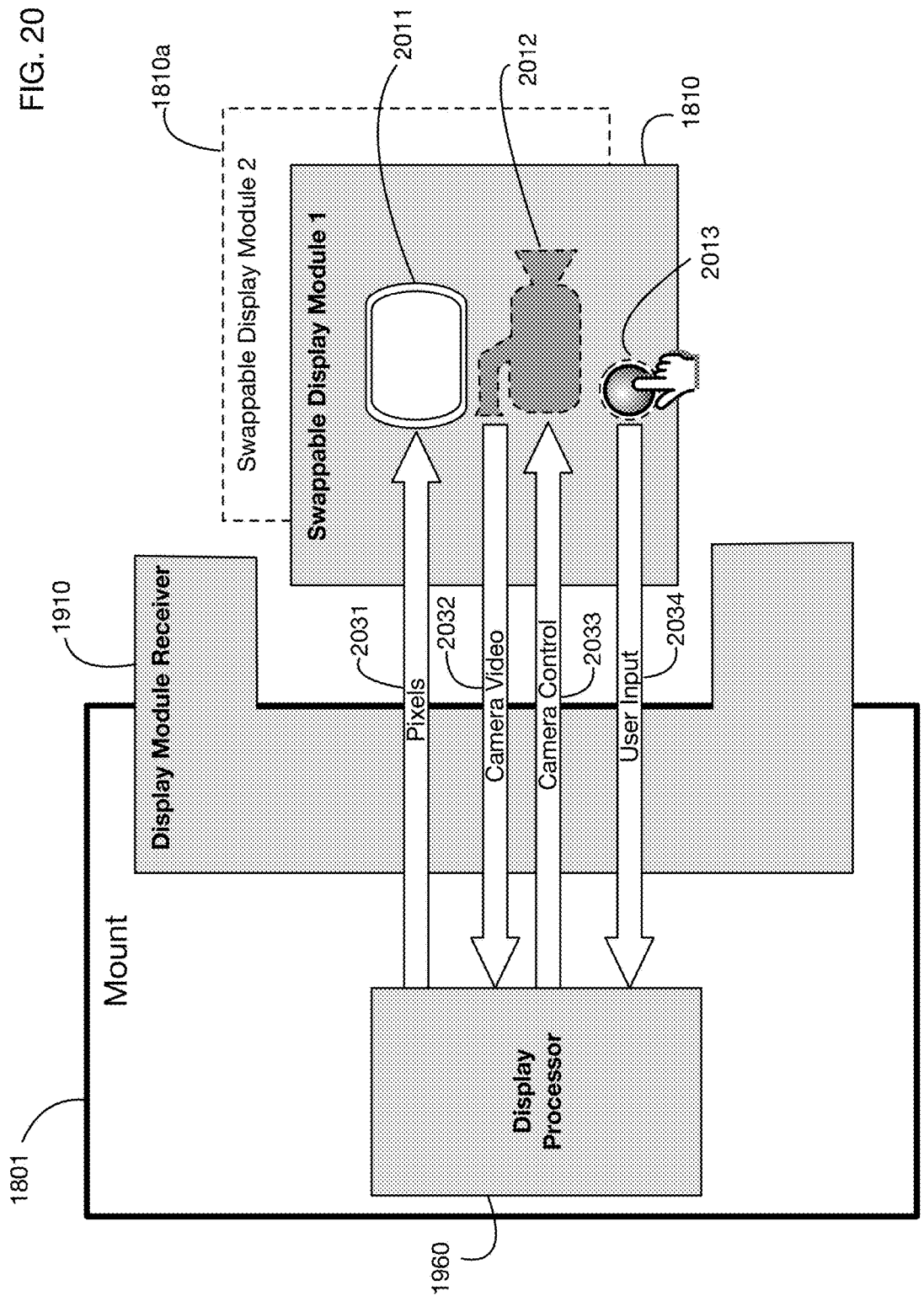
FIG. 20 illustrates an embodiment of the data channels between the display module receiver and a swappable display module.

FIG. 20 illustrates communication paths between a swappable display module 1810 and a display processor 1960 in an embodiment of the system. Embodiments of the system may use wired or wireless communication, or any combination thereof, for any electronic communication path. Embodiments may use any desired media and protocols for transfer of information. In the embodiment shown in FIG. 20, swappable display module 1810 has a display screen 2011, an optional camera 2012, and an optional user input control 2013. These components are illustrative; swappable display modules may contain any or all of these elements, in any desired number, as well as other elements. In particular, one or more embodiments may employ multiple displays, such as for example a separate display for each eye of the user. One or more embodiments may employ multiple cameras, such as for example a separate camera for each eye of the user. One or more embodiments may employ any number of user input controls in one or more swappable display modules. Embodiments may include any desired type of user input controls, such as for example, without limitation, buttons, switches, touchscreens, sliders, knobs, dials, keys, keyboards, touchpads, pointing devices, or joysticks.

Pixel channel 2031 carries output images from the display processor 1960 to the display 2011. Embodiments may use any desired format for transferring pixels to the displays. If optional camera 2012 is present, camera video channel 2032 carries video captured by the camera to the display processor 1960. In one or more embodiments a camera video channel may also carry audio data or static image data, for example. Camera control channel 2033 carries camera control commands from the display processor 1960 to the camera 2012. Camera control commands may for example include commands to zoom, pan, tilt, change capture frame rates or resolutions, or modify contrast or color balance. If one or more optional user input controls 2013 are present, display user input channel 2014 carries user input from these controls to the display processor 1960. These specific channels as shown in FIG. 20 are illustrative; one or more embodiments may use any number of communication channels in any desired configuration to transfer data between a display processor and a swappable display module. In particular, in one or more embodiments multiple channels may be combined onto common communications paths.

The embodiment shown in FIG. 20 includes a second swappable display module 1810a. If the first swappable display module 1810 is removed and is replaced by 1810a, the communications paths 2031, 2032, 2033, and 2034 will be established with the new module 1810a. Swappable display modules may include different components, in which case only certain communication paths may be active depending on which swappable display module is installed.

Figure 21:
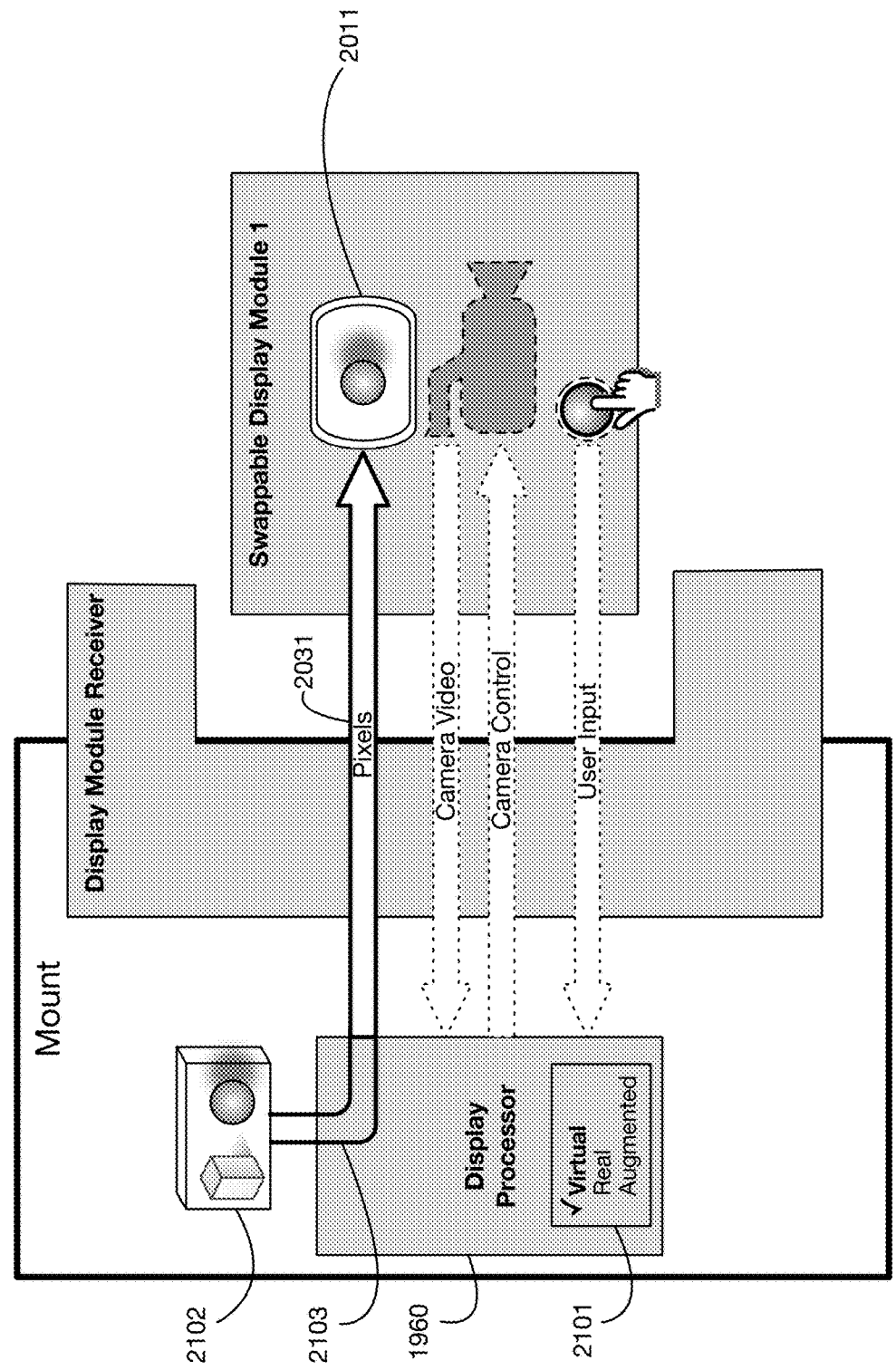
FIG. 21 illustrates an embodiment of the system that has multiple operating modes for the display; it shows operation in virtual mode where the system generates the display from a stored 3D model.

In one or more embodiments, the display processor or other processors may provide multiple operating modes that affect how the components of the swappable display modules function. FIG. 21 illustrates a variation of the embodiment shown in FIG. 20, which supports three different operating modes 2101. The three illustrated operating modes are virtual mode, which generates display images from a virtual environment; real mode, which generates images from a real scene; and augmented reality mode, which combines system-generated data with real scene images. FIG. 21 illustrates the embodiment functioning in virtual mode. In this mode the display processor 1960 obtains or calculates image data 2103 from a 3D virtual environment 2102. The pixel channel 2031 sends this generated image data directly to display 2011.

Figure 22:
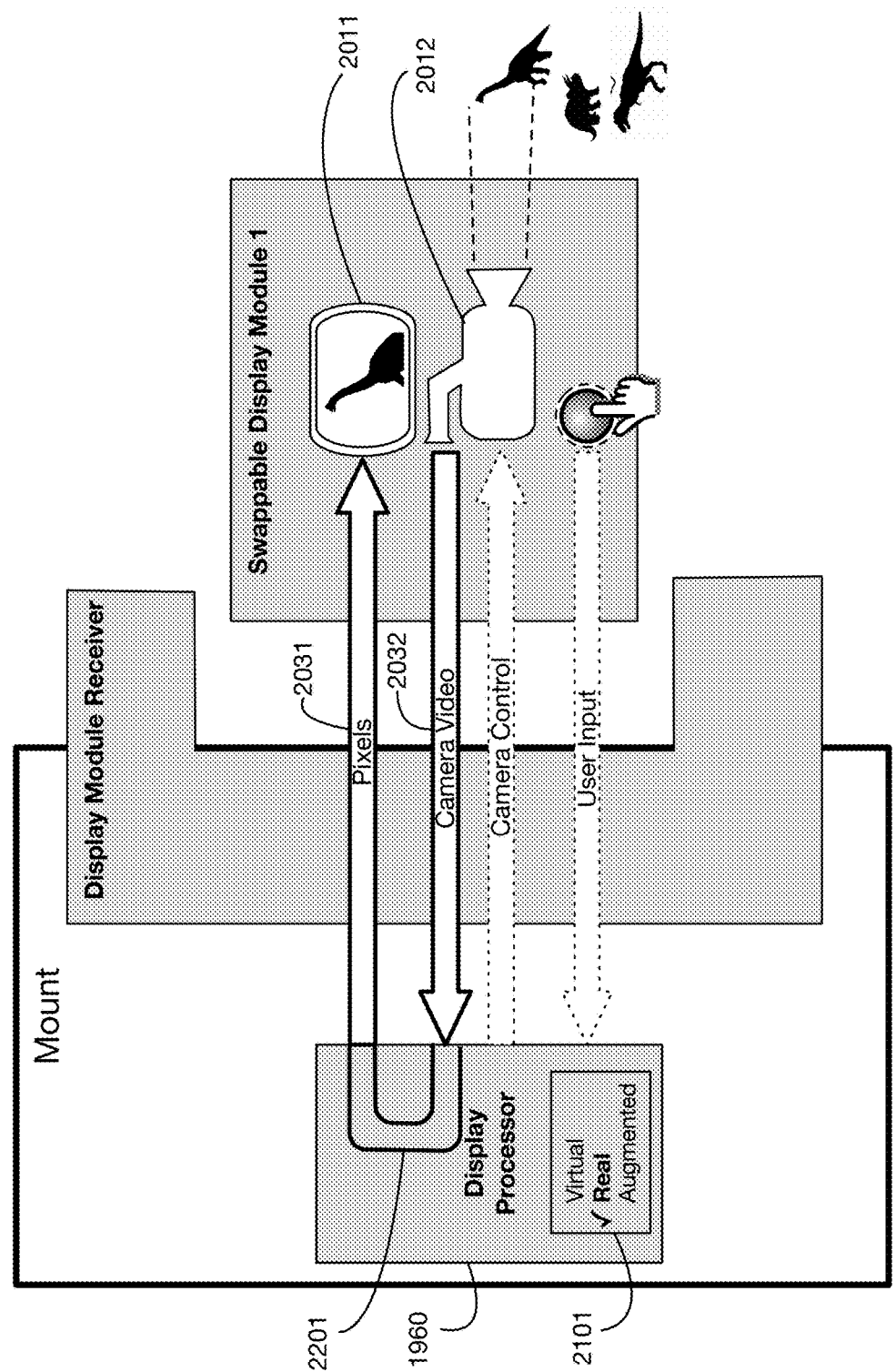
FIG. 22 shows the embodiment of FIG. 21 operating in real mode, where images captured by a camera are shown on the display.

FIG. 22 illustrates the embodiment of FIG. 21 operating in real mode. In this mode images captured by camera 2012 are sent to the display processor 1960 on camera video channel 2032; the display processor then sends these images 2201 back to display 2011 along pixel channel 2031. The image viewed by the users therefore reflects the real images from the real scene. In one more embodiments a switch may be provided in a swappable display module to send camera video images directly to a display without going through a display processor. In one or more embodiments the display processor 1960 may modify the camera video from channel 2032 for presentation on display 2011; for example, the display processor may modify resolution or other video parameters to fit the requirements of the display 2011.

Figure 23:
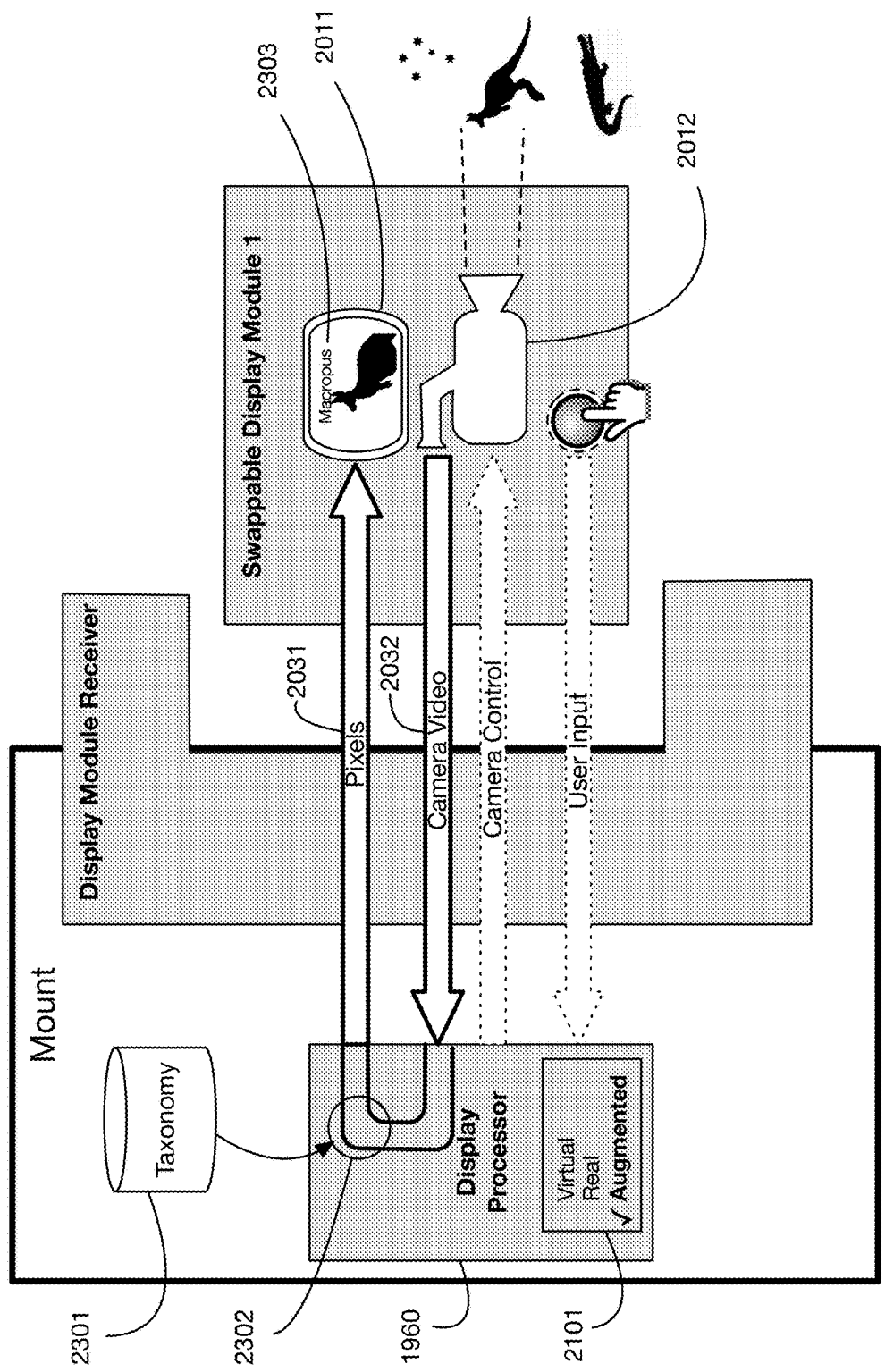
FIG. 23 shows the embodiment of FIG. 21 operating in augmented reality mode, where camera images are overlaid with text or graphics generated by the system.

FIG. 23 illustrates the embodiment of FIG. 21 operating in augmented reality mode. In this mode images captured by camera 2012 are sent to the display processor 1960 on camera video channel 2032. Unlike real mode, which largely forwards this camera video to the display 2011 (possibly with reformatting or other alterations), in augmented reality mode the display processor 1960 combines camera video data with other information. This information may be added to the camera video images as for example overlays of text, graphics, other images, or any other alterations of the camera video images appropriate to display the augmented information. FIG. 23 illustrates an embodiment that accesses a taxonomy database 2301 and uses this database to identify the genus of animals viewed in the scene by the camera 2012. Display processor 1960 performs an overlay function 2302 to modify the incoming video on channel 2032, and forwards the modified images on pixel channel 2031. In this example, the genus of the animal in view is displayed as a text overlay on the camera video image from the scene. One or more embodiments may augment camera video images in any desired manner with any desired additional information. For example, without limitation, embodiments may alter incoming camera video with overlays of text or graphics or other images, via modifications to the size or color of objects in the scene, via insertion of other video clips into the pixel stream, or in any other desired manner. One or more embodiments may access any information sources, including information sources local to the system or external to the system, in order to generate augmented images with additional information. One or more embodiments may augment scene images automatically, using for example image processing to identify objects of interest. One or more embodiments may augment scene images based on manual commands from the user, received for example over the user input channel.

FIGS. 24 through 27 illustrate embodiments of the invention with swappable audio modules that may be operated in different modes. The illustrated architecture of these audio embodiments is similar to the embodiments illustrated above for swappable display modules.

Figure 24:
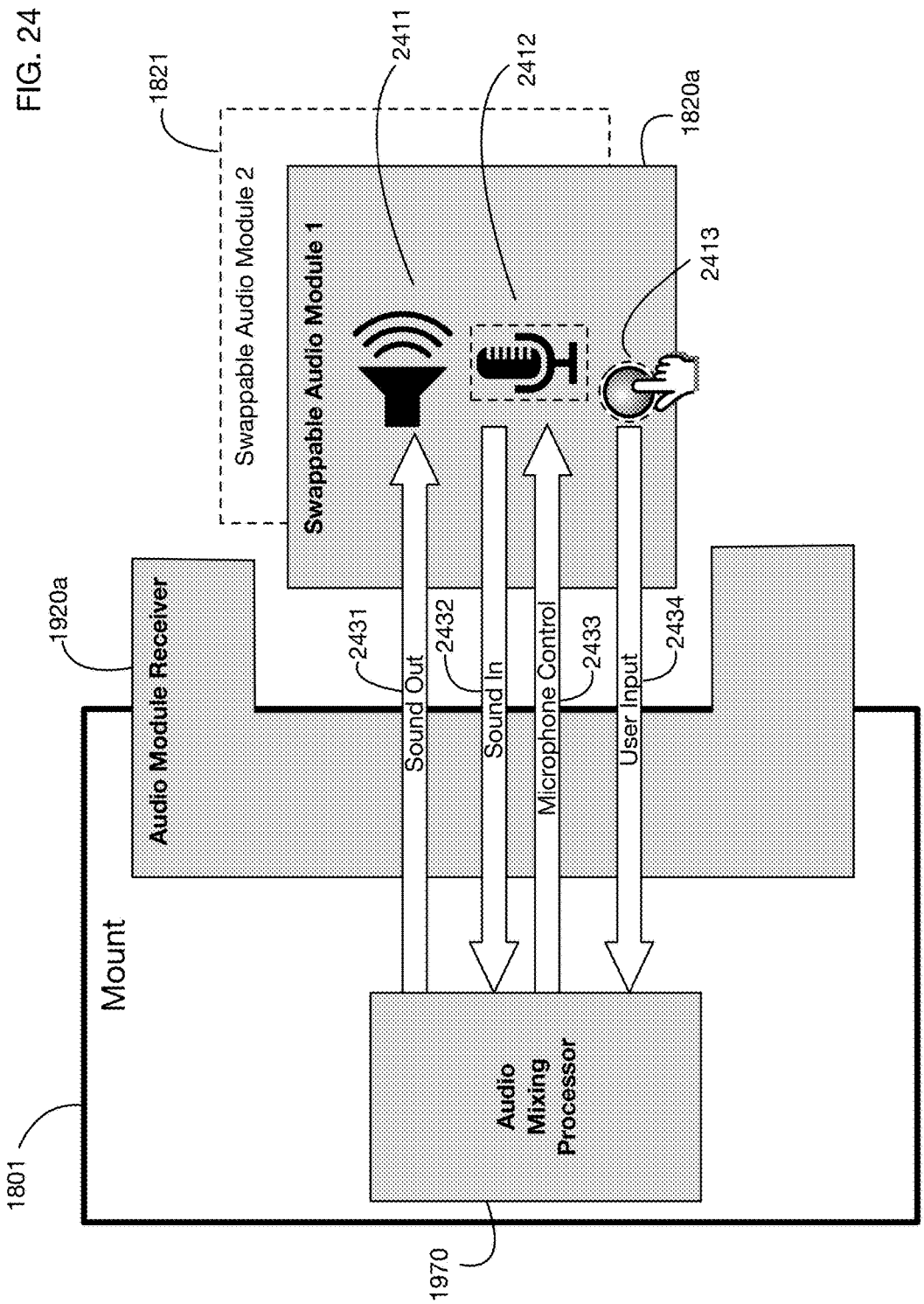
FIG. 24 illustrates an embodiment of the data channels between the audio module receiver and a swappable audio module.

FIG. 24 illustrates communication paths between a swappable audio module 1820a and an audio mixing processor 1970 in an embodiment of the system. Embodiments of the system may use wired or wireless communication, or any combination thereof, for any electronic communication path. Embodiments may use any desired media and protocols for transfer of information. In the embodiment shown in FIG. 24, swappable audio module 1820a has a speaker 2411, an optional microphone 2412, and an optional user input control 2413. These components are illustrative; swappable audio modules may contain any or all of these elements, in any desired number, as well as other elements. In particular, one or more embodiments may employ multiple speakers, such as for example a separate speaker for each ear of the user. One or more embodiments may employ multiple microphones, such as for example a separate microphone for each ear of the user. One or more embodiments may employ any number of user input controls in one or more swappable audio modules. Embodiments may include any desired type of user input controls, such as for example, without limitation, buttons, switches, touchscreens, sliders, knobs, dials, keys, keyboards, touchpads, pointing devices, or joysticks.

Audio output channel 2431 carries output sounds from the audio mixing processor 1970 to the speaker 2411. Embodiments may use any desired format for transferring audio to the speakers. If optional microphone 2412 is present, audio input channel 2432 carries sounds captured by the microphone to the audio mixing processor 1970. Microphone control channel 2433 carries microphone control commands from the audio mixing processor 1970 to the microphone 2412. Microphone control commands may for example include commands to modify gain or noise reduction. If one or more optional user input controls 2413 are present, audio user input channel 2434 carries user input from these controls to the audio mixing processor 1970. These specific channels as shown in FIG. 24 are illustrative; one or more embodiments may use any number of communication channels in any desired configuration to transfer data between an audio mixing processor and a swappable audio module. In particular, in one or more embodiments multiple channels may be combined onto common communications paths.

The embodiment shown in FIG. 24 includes a second swappable audio module 1821. If the first swappable audio module 1820a is removed and is replaced by 1821, the communications paths 2431, 2432, 2433, and 2434 will be established with the new module 1821. Swappable audio modules may include different components, in which case only certain communication paths may be active depending on which swappable audio module is installed.

Figure 25:
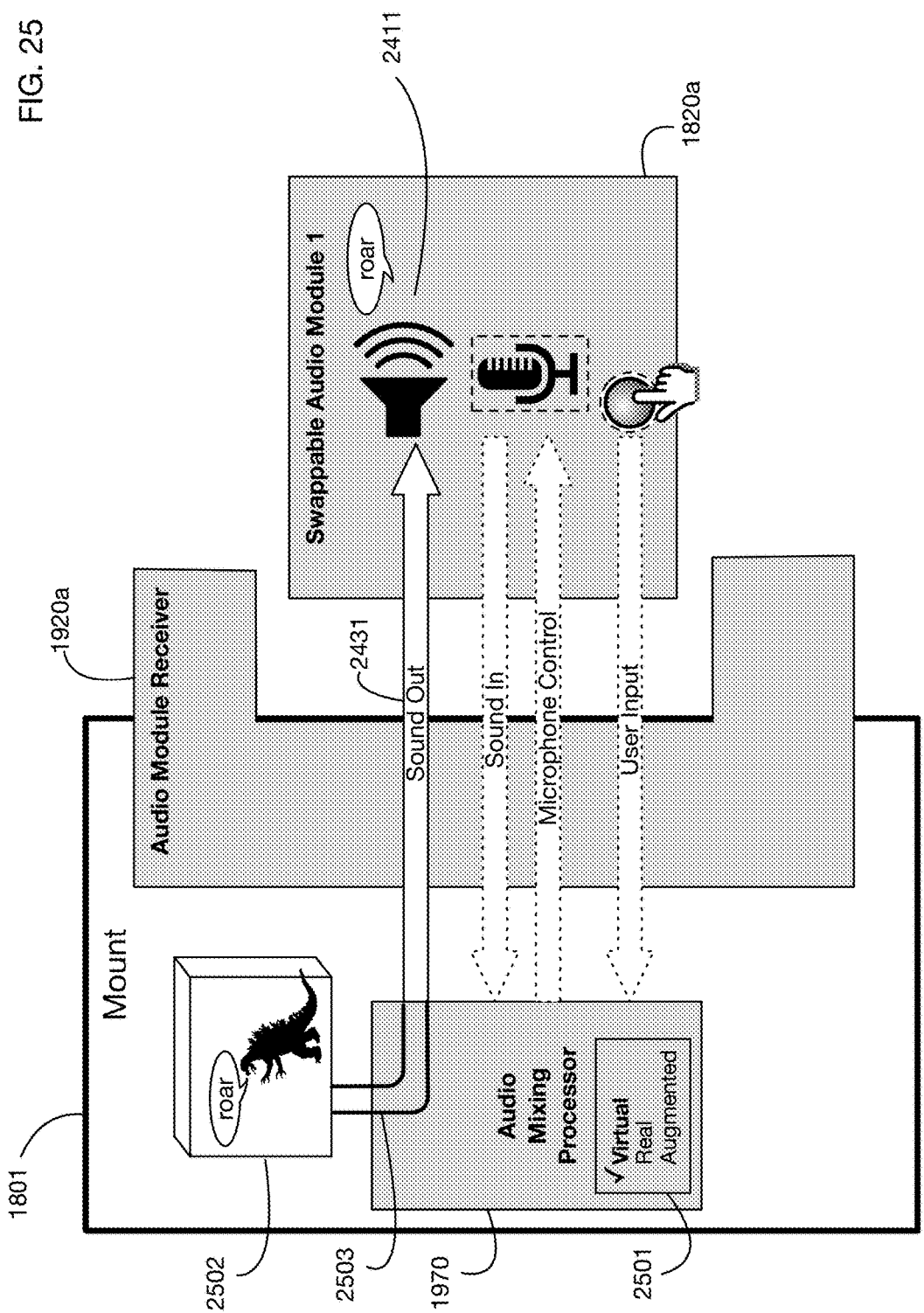
FIG. 25 illustrates an embodiment of the system that has multiple operating modes for the audio; it shows operation in virtual mode where the system generates the audio from a stored 3D model.

Similar to the multiple modes described above for display, one or more embodiments may support multiple operating modes for audio that affect how the components of the swappable audio modules function. FIG. 25 illustrates a variation of the embodiment shown in FIG. 24, which supports three different operating modes 2501. Like the display modes described above, the three illustrated audio operating modes are virtual mode, which generates sounds from a virtual environment; real mode, which captures and plays audio from a real scene; and augmented reality mode, which combines system-generated audio data with real scene audio. FIG. 25 illustrates the embodiment functioning in virtual mode. In this mode the audio mixing processor 1970 obtains or calculates audio data 2503 from a 3D virtual environment 2502. The audio output channel 2431 sends this generated audio data directly to speaker 2411.

Figure 26:
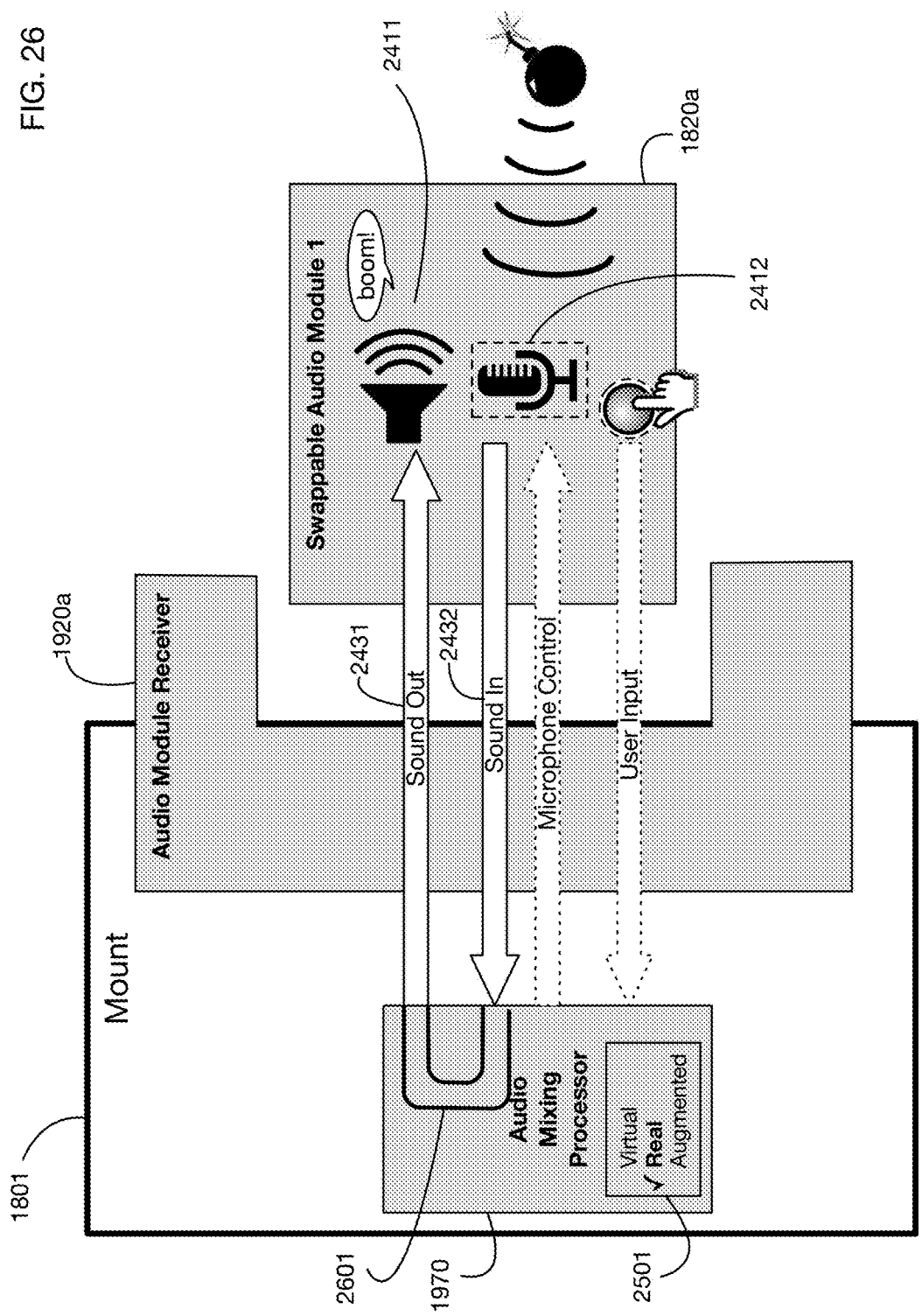
FIG. 26 shows the embodiment of FIG. 25 operating in real mode, where audio captured by a microphone is sent to the speakers.

FIG. 26 illustrates the embodiment of FIG. 25 operating in real mode. In this mode sounds captured by microphone 2412 are sent to the audio mixing processor 1970 on audio input channel 2432; the audio mixing processor then sends these sounds 2601 back to speaker 2411 along audio output channel 2431. The sounds heard by the users therefore reflect the real sounds from the real scene. In one more embodiments a switch may be provided in a swappable audio module to send the microphone audio input directly to a speaker without going through an audio mixing processor. In one or more embodiments the audio mixing processor 1970 may modify the audio from audio input channel 2432 for output on speaker 2411; for example, the audio mixing processor may modify the gain or other audio parameters to fit the requirements of the speaker 2411.

Figure 27:
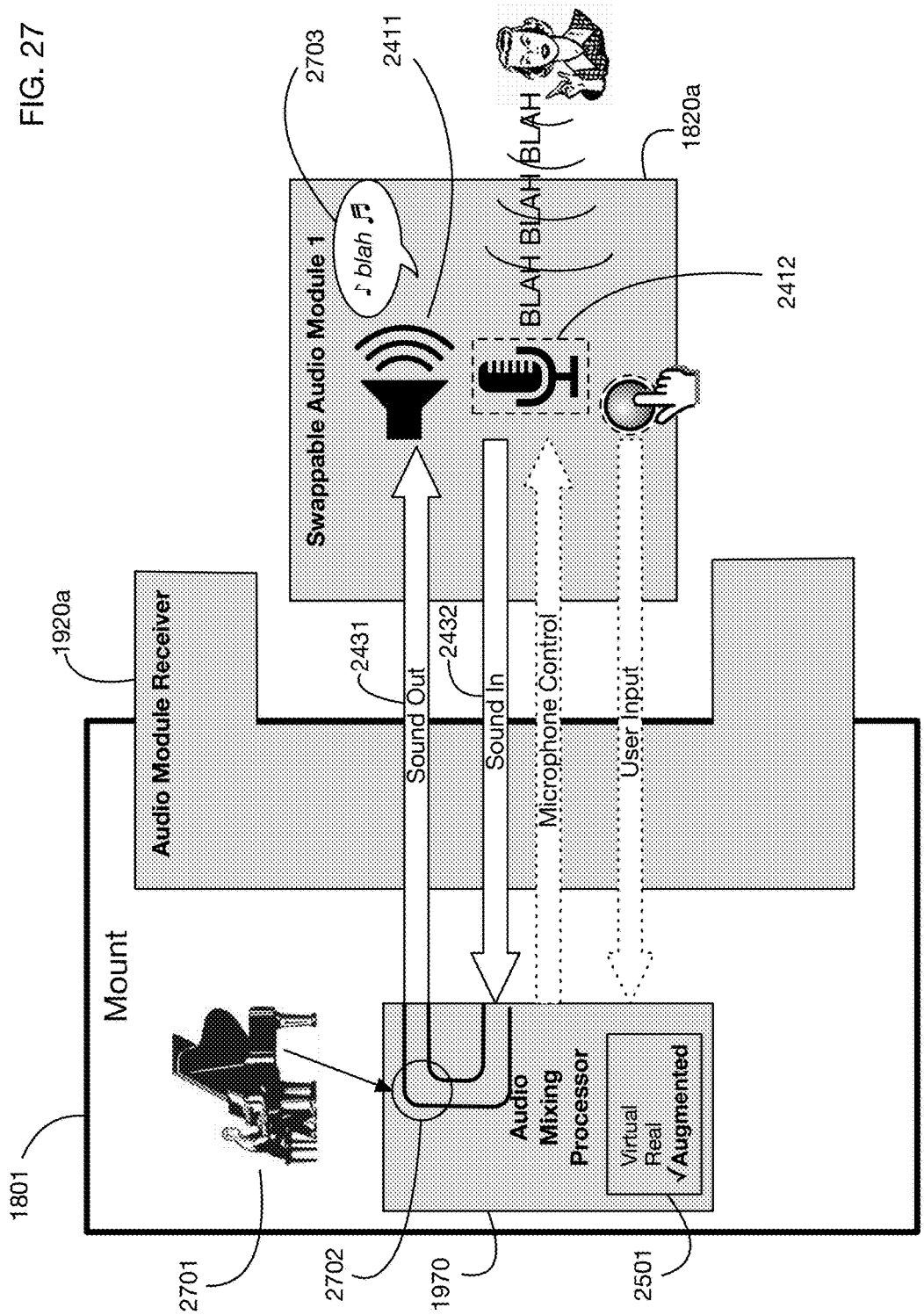
FIG. 27 shows the embodiment of FIG. 25 operating in augmented reality mode, where audio captured by a microphone is modified and remixed with audio generated by the system.

FIG. 27 illustrates the embodiment of FIG. 25 operating in augmented reality mode. In this mode sounds captured by microphone 2412 are sent to the audio mixing processor 1970 on audio input channel 2432. Unlike real mode, which largely forwards this audio to the speaker 2411 (possibly with reformatting or other alterations), in augmented reality mode the audio mixing processor 1970 alters or otherwise combines incoming audio data with other information. This information may be added to the audio as for example background sounds, interspersed sounds or words, translations of words, commentaries, modified audio frequencies or amplitudes, or any other alterations of the incoming audio appropriate to include the augmented information. FIG. 27 illustrates an embodiment that uses a music synthesizer 2701 to provide a pleasant background soundtrack to accompany the sounds captured by microphone 2412. Audio mixing processor 1970 performs a mixing function 2702 to modify the incoming audio on channel 2432, and forwards the modified audio on audio output channel 2431. The sound 2703 output from the speaker includes the background music along with audio captured from the microphone. One or more embodiments may augment incoming audio in any desired manner with any desired additional information. For example, without limitation, embodiments may alter incoming audio with background music, background sounds, via noise cancellation, via modifications to the frequencies or amplitudes of sounds, via filtering of selected sounds, via insertion of other audio clips into the audio stream, or in any other desired manner. One or more embodiments may perform for example translation of incoming audio from one language to another. One or more embodiments may insert words, phrases, sentences, or any spoken text to describe objects in a scene. One or more embodiments may access any information sources, including information sources local to the system or external to the system, in order to generate augmented audio with additional information. One or more embodiments may augment audio automatically, using for example audio processing to identify sounds of interest. One or more embodiments may augment audio based on manual commands from the user, received for example over the audio user input channel.

While the invention herein disclosed has been described by means of specific embodiments and applications thereof, numerous modifications and variations could be made thereto by those skilled in the art without departing from the scope of the invention set forth in the claims.

What is claimed is:

1. A modular multi-mode virtual reality headset comprising:
   a mount configured to be attached to a head of a user;
   a display processor coupled to said mount;
   a display module receiver coupled to said mount;
   one or more swappable display modules, each configured to be detachably coupled to said display module receiver and located in front of said user's eyes when coupled to said display module receiver, each comprising
      one or more displays;
      one or more cameras; and,
      one or more display user input controls;
   a display module electronic interface integrated into said display module receiver, comprising
      a pixel channel that transfers pixel data from said display processor to said one or more displays;
      a camera video channel that transfers camera video captured by said one or more cameras to said display processor;

a camera control channel that transfers camera control commands from said display processor to said one or more cameras; and,
a display user input channel that transfers user input commands from said one or more display user input controls to said display processor;
wherein said display processor is configured to function in a plurality of operating modes comprising
a virtual mode wherein
said pixel data is generated from a model or a stored capture;
a real mode wherein
said pixel data comprises said camera video;
an augmented reality mode wherein
said pixel data comprises said camera video overlaid with text or graphics or images generated or obtained by said display processor;
wherein one or more of said one or more swappable display modules comprise
a left display located in front of a left eye of said user, wherein said left display is tangent to a left plane;
a right display located in front of a right eye of a user, wherein said right display is tangent to a right plane; and,
one or more lenses located between the left and right eyes of said user and the left and right displays; and, wherein
an angle between said left plane and said right plane is less than 180 degrees, when measured from a side closest to the left and right eyes of said user;
said left display forms a left display image by said one or more lenses that is substantially in focus for said left eye of said user;
said right display forms a right display image by said one or more lenses that is substantially in focus for said right eye of said user;
said left display image viewed by said left eye of said user extends across a wider horizontal field of view than said left display viewed by said left eye of said user without said one or more lenses; and,
said right display image viewed by said right eye of said user extends across a wider horizontal field of view than said right display viewed by said right eye of said user without said one or more lenses.

2. The system of claim 1 further comprising
one or more audio module receivers coupled to said mount;
an audio mixing processor coupled to said mount;
one or more swappable audio modules, each configured to be detachably coupled to one of said one or more audio module receivers and located proximal to one or more of said user's ears when coupled to said audio module receiver, each comprising
one or more speakers;
one or more microphones;
one or more audio user input controls;
an audio module electronic interface integrated into each of said one or more audio module receivers, each comprising
an audio output channel that transfers output sound data from said audio mixing processor to said one or more speakers;
an audio input channel that transfers input sound data captured by said one or more microphones to said audio mixing processor;
a microphone control channel that transfers microphone control commands from said audio mixing processor to said one or more microphones;
an audio user input channel that transfers user input commands from said one or more audio user input controls to said audio mixing processor; and,
wherein said audio mixing processor is configured to function in a plurality of operating modes comprising
a virtual mode wherein
said output sound data is generated from a model or a stored capture;
a real mode wherein
said output sound data comprises said input sound data; and,
an augmented reality mode wherein
said output sound data comprises said input sound data modified by said audio mixing processor.

3. The system of claim 1 further comprising
one or more sensor module receivers coupled to said mount;
a sensor data processor coupled to said mount;
one or more swappable sensor modules, each configured to be detachably coupled to one of said one or sensor module receivers, each comprising one or more sensors that measure one or sensor data values indicative of one or more of
a position of said user;
an orientation of said user;
a change in the position of said user; and,
a change in the orientation of said user;
a sensor module electronic interface integrated into each of said one or more sensor module receivers, each comprising
a sensor data channel that transfers sensor data from said one or more sensors to said sensor data processor; and,
wherein said sensor data processor
calculates said position of said user, or said orientation of said user, or both of said position of said user and said orientation of said user, from said one or more sensor data values; and,
transfers said position of said user, or said orientation of said user, or both of said position of said user and said orientation of said user to said display processor.

4. The system of claim 1 wherein
said left display is substantially flat; and,
said right display is substantially flat.

5. The system of claim 1 wherein at least one of said one or more lenses comprise a gradient index lens.

6. The system of claim 1 wherein at least one of said one or more lenses comprise a Fresnel lens.

7. The system of claim 1 wherein at least one of said one or more lenses comprise a holographic optical element.

8. The system of claim 1 wherein a combined horizontal field of view of said left display image and said right display image is at least 120 degrees.

9. The system of claim 1 wherein a combined horizontal field of view of said left display image and said right display image is at least 150 degrees.

10. The system of claim 1 wherein a combined horizontal field of view of said left display image and said right display image is at least 180 degrees.

11. The system of claim 1, wherein one or more of said one or more swappable display modules further comprise
a left peripheral light emitter located on a left side of said left display;

a right peripheral light emitter located on a right side of said right display; and,
wherein
light from said left peripheral light emitter is projected left of the left display image; and,
light from said right peripheral light emitter is projected right of the right display.

12. The system of claim 11, wherein said left peripheral light emitter and said right peripheral light emitter each comprise a plurality of peripheral light pixels located at different vertical positions.

13. The system of claim 12, wherein a vertical resolution of said peripheral light pixels is less than a vertical resolution of each of said one or more displays.

14. The system of claim 11, wherein one or more of said one or more swappable display modules further comprise
one or more left reflective surfaces located to the left of said one or more displays;
one or more right reflective surfaces located to the right of said one or more displays; and,
wherein
at least a portion of said light from said left peripheral light emitter is reflected from said one or more left reflective surfaces towards said left eye of said user; and,
at least a portion of said light from said right peripheral light emitter is reflected from said one or more right reflective surfaces towards said right eye of said user.

15. The system of claim 11, wherein a total horizontal field-of-view spanned by said left display image, said right display image, said light from said left peripheral light emitter viewed by said user, and said light from said right peripheral light emitter viewed by said user is at least 180 degrees.

16. A modular multi-mode virtual reality headset comprising:
a mount configured to be attached to a head of a user;
a display processor coupled to said mount;
a display module receiver coupled to said mount;
one or more swappable display modules, each configured to be detachably coupled to said display module receiver and located in front of said user's eyes when coupled to said display module receiver, each comprising
one or more displays;
one or more cameras;
one or more display user input controls;
a display module electronic interface integrated into said display module receiver, comprising
a pixel channel that transfers pixel data from said display processor to said one or more displays;
a camera video channel that transfers camera video captured by said one or more cameras to said display processor;
a camera control channel that transfers camera control commands from said display processor to said one or more cameras; and,
a display user input channel that transfers user input commands from said one or more display user input controls to said display processor;
one or more audio module receivers coupled to said mount;
an audio mixing processor coupled to said mount;
one or more swappable audio modules, each configured to be detachably coupled to one of said one or more audio module receivers and located proximal to one or more of said user's ears when coupled to said audio module receiver, each comprising
one or more speakers;
one or more microphones; and,
one or more audio user input controls;
an audio module electronic interface integrated into each of said one or more audio module receivers, each comprising
an audio output channel that transfers output sound data from said audio mixing processor to said one or more speakers;
an audio input channel that transfers input sound data captured by said one or more microphones to said audio mixing processor;
a microphone control channel that transfers microphone control commands from said audio mixing processor to said one or more microphones; and,
an audio user input channel that transfers user input commands from said one or more audio user input controls to said audio mixing processor;
one or more sensor module receivers coupled to said mount;
a sensor data processor coupled to said mount;
one or more swappable sensor modules, each configured to be detachably coupled to one of said one or sensor module receivers, each comprising one or more sensors that measure one or sensor data values indicative of one or more of a position of said user;
an orientation of said user;
a change in the position of said user; and,
a change in the orientation of said user;
a sensor module electronic interface integrated into each of said one or more sensor module receivers, each comprising
a sensor data channel that transfers sensor data from said one or more sensors to said sensor data processor;
wherein said display processor is configured to function in a plurality of operating modes comprising
a virtual mode wherein
said pixel data is generated from a model or a stored capture;
a real mode wherein
said pixel data comprises said camera video; and,
an augmented reality mode wherein
said pixel data comprises said camera video overlaid with text or graphics or images generated or obtained by said display processor;
wherein said audio mixing processor is configured to function in a plurality of operating modes comprising
a virtual mode wherein
said output sound data is generated from a model or a stored capture;
a real mode wherein
said output sound data comprises said input sound data; and,
an augmented reality mode wherein
said output sound data comprises said input sound data modified by said audio mixing processor; and,
wherein said sensor data processor
calculates said position of said user, or said orientation of said user, or both of said position of said user and said orientation of said user, from said one or more sensor data values; and, transfers said position of said user, or said orientation of said user, or both of said position of said user and said orientation of said user to said display processor and to said audio mixing processor.

17. The system of claim 16, wherein one or more of said one or more swappable display modules comprise
- a left display located in front of a left eye of said user, wherein said left display is tangent to a left plane;
- a right display located in front of a right eye of a user, wherein said right display is tangent to a right plane;
- one or more lenses located between the left and right eyes of said user and the left and right displays; and,
- wherein
  - an angle between said left plane and said right plane is less than 180 degrees, when measured from a side closest to the left and right eyes of said user;
  - said left display forms a left display image by said one or more lenses that is substantially in focus for said left eye of said user;
  - said right display forms a right display image by said one or more lenses that is substantially in focus for said right eye of said user;
  - said left display image viewed by said left eye of said user extends across a wider horizontal field of view than said left display viewed by said left eye of said user without said one or lenses;
  - said right display image viewed by said right eye of said user extends across a wider horizontal field of view than said right display viewed by said right eye of said user without said one or more lenses; and,
  - at least one of said one or more lenses comprise a gradient index lens or a Fresnel lens or a holographic optical element.

18. The system of claim 17 wherein
said left display is substantially flat; and,
said right display is substantially flat.

19. The system of claim 17, wherein one or more of said one or more swappable display modules further comprise
- a left peripheral light emitter located on a left side of said left display and comprising a plurality of peripheral light pixels located at different vertical positions;
- a right peripheral light emitter located on a right side of said right display and comprising a plurality of peripheral light pixels located at different vertical positions; and,
- wherein
  - a vertical resolution of said peripheral light pixels is less than a vertical resolution of each of said one or more displays;
  - light from said left peripheral light emitter is projected left of the left display image;
  - light from said right peripheral light emitter is projected right of the right display; and,
  - a total horizontal field-of-view spanned by said left display image, said right display image, said light from said left peripheral light emitter viewed by said user, and said light from said right peripheral light emitter viewed by said user is at least 180 degrees.

* * * * *